US011395986B2

(12) United States Patent
Browne et al.

(10) Patent No.: US 11,395,986 B2
(45) Date of Patent: Jul. 26, 2022

(54) METHOD AND SYSTEM FOR DRYING COMPRESSED AIR

(71) Applicants: Jeffrey S. Browne, Clarence, NY (US); David R. Arno, East Amherst, NY (US); John A. Carlin, Buffalo, NY (US); Jeffrey G. Ewers, Grand Island, NY (US); William G. Schultz, III, Amherst, NY (US)

(72) Inventors: Jeffrey S. Browne, Clarence, NY (US); David R. Arno, East Amherst, NY (US); John A. Carlin, Buffalo, NY (US); Jeffrey G. Ewers, Grand Island, NY (US); William G. Schultz, III, Amherst, NY (US)

( * ) Notice: Subject to any disclaimer, the term of this patent is extended or adjusted under 35 U.S.C. 154(b) by 292 days.

(21) Appl. No.: 16/859,503

(22) Filed: Apr. 27, 2020

(65) Prior Publication Data

US 2021/0331114 A1    Oct. 28, 2021

(51) Int. Cl.
*B01D 53/26*   (2006.01)
*B01D 53/04*   (2006.01)
*B01D 53/047*  (2006.01)

(52) U.S. Cl.
CPC ....... *B01D 53/0454* (2013.01); *B01D 53/047* (2013.01); *B01D 53/0446* (2013.01); *B01D 53/261* (2013.01); *B01D 2259/401* (2013.01); *B01D 2259/40043* (2013.01)

(58) Field of Classification Search
CPC .. B01D 53/047; B01D 53/04; B01D 53/0446; B01D 53/0454; B01D 53/261; B01D 2259/40043; B01D 2259/40086; B01D 2259/401

USPC ........ 95/10, 11, 117, 148; 96/108, 109, 111, 96/121; 34/80, 472, 473
See application file for complete search history.

(56) References Cited

U.S. PATENT DOCUMENTS

| | | | | |
|---|---|---|---|---|
| 4,127,395 A | * | 11/1978 | McKey | B01D 53/261 95/122 |
| 4,197,097 A | * | 4/1980 | Magorien | F15B 21/044 73/302 |
| 4,761,968 A | | 8/1988 | Basseen et al. | |
| 4,971,610 A | * | 11/1990 | Henderson | B01D 53/0454 96/111 |
| 6,099,620 A | | 8/2000 | Arno et al. | |

(Continued)

*Primary Examiner* — Frank M Lawrence, Jr.
(74) *Attorney, Agent, or Firm* — Vincent G. Lotempio, Esq.

(57) ABSTRACT

Drying compressed air while utilizing a method for preemptive overload avoidance of moisture to a desiccant bed, including a recovery control process. The method may include a purge means, an initialization period for pre-learning to develop usage-profile log performance summary to compare against real-time data and a protocol for a normal state, a recovery state and a supplemental purge state and means to reestablish normal operations. A procedure for standby and overload alarm alerting states are also described. The purge means may be fixed rate or modulating. The system may have cycle times decrementing or incrementing stepwise in a predetermined or varying time frame to respond to on-going trending data in order to correct imbalance loading conditions by adjusting drying and regenerating cycle times, thus affording a stable delivery of quality dewpoint compressed air to the dryer output.

20 Claims, 11 Drawing Sheets

(56) References Cited

U.S. PATENT DOCUMENTS

| | | | |
|---|---|---|---|
| 8,425,673 B2 | 4/2013 | Burke | |
| 9,744,496 B1 * | 8/2017 | Chrivia | B01D 53/261 |
| 9,839,874 B2 | 12/2017 | Kipp et al. | |
| 2008/0148938 A1 * | 6/2008 | Rege | B01D 53/047 96/121 |

* cited by examiner

METHOD AND SYSTEM FOR DRYING COMPRESSED AIR

FIELD

The present disclosure relates to the field of compressed air desiccant drying, and more particularly to recovering from moisture overloading when a drying system becomes out of balance with respect to dry air output quality, and the automatic recovery thereof to normalize operations.

BACKGROUND

In the field of compressed air-drying systems, there are many examples of various technology approaches. The present disclosure relates specifically to desiccant drying; where compressed air is passed over a bed of a drying agent, such as activated alumina for example, to capture moisture vapors and thus dehydrate the compressed air for industrial and manufacturing purposes. Of the desiccant dryer types there are at least four regenerating processes; heatless purge, vacuum, externally heated purge, and, blower (heated) purge. Further, there can be single tower (tanks filled with desiccant), twin tower, up-flow drying or down-flow drying (counter-flow regeneration or same flow regeneration). All these configurations have their own 'set' of problems in keeping balance with respect to the dryer air quality output, and, an acceptable cost of consistent operation to the compressed air system.

A brief discussion of the need for dry compressed air may be helpful in understanding the present disclosure. Industry, and all manner of manufacturing, relies on compressed air to drive, move, process, facilitate, etc., in service to produce goods or process functions, throughout the manufacturing or industrial facility. Compressed air is one of the most expensive factors in manufacturing or operation. Due to the high cost associated with compressed air, care in the facility design and need is of foremost consideration. Highly sensitive operations, for example, integrated circuit chip manufacturing, pharmaceutical production or paint application, to name just a few, cannot tolerate even small traces of untreated compressed air. Any failure in the compressed air system to deliver the expected quality, can result in a 'fouled' production of goods, or damage (via moisture) to equipment and downtime.

Currently, to assure a quality compressed air service, expressed as a 'dewpoint' of the air, industrial engineers have relied on elaborate backup systems in the event of dryer malfunction, for example, when the dryer become overloaded and the dewpoint significantly and rapidly deteriorates. Such backup systems may include having redundant dryers, or compressors and dryer combinations, and filters. In these cases, there would be a need for mechanically switching such redundant compressor and dryer systems on-line and off-line, resulting in high labor personnel and monitoring expenses. All these costs are on top of an already highly expensive utility, compressed air.

Compressed air starts, at the output of the compressor as dirty, very wet (100% saturated) and possibly contaminated with hydrocarbon chemicals due to the compressor generating the air. Certainly, drains at the compressor output would immediately remove some liquid 'slugs' of water. Further a facility may employ a demister to help capture the vast quantities of liquid and still further, coalescing filters to reduce liquids and contaminants. At this point, even the best of pre-treatment devices can only remove the liquified elements in the compressed air. The compressed air is still 100% saturated with moisture vapor, completely unusable for most industry purposes, and must be dried.

To better understand the complexities of this important industrial utility, these discussions herein shall be limited to the simplest of configurations. That is, a 'heatless' twin tower having basic operational standards. The dryer capacity can be of any size in terms of standard cubic feet per minute (SCFM); for example, 5, 50, 500, 5000 SCFM, etc. The principles remain the same for any size drying device. The compressed air system must consider the compressor size (usually expressed in horsepower but would be of equal SCFM) to dryer capacity to factory use for stability. If any of these are outside of their design parameters, this will cause unnecessary operating expense and low-quality compressed air performance. Even the best designed systems will have performance issues, for example, an unexpected heavy load; such as several pieces of factory equipment all running with heavy air use together (when the system design did not take in account such an event). The air pressure would drop and the through-put of compressed air over the desiccant tower would upsurge the stratified moisture layers within the desiccant bed. The dryer output quality would suffer significantly. If this event is not monitored, and immediate measures are not taken to relieve the overload, the desiccant bed can become completely saturated, and result in the factory downstream being compromised in a very short time. The question in this scenario (or one like it) is not if it could happen, but, when it will happen and how long it will take to detect a problem and make corrections. Downtime and production fouling could easily result, thereby causing serious problems and most likely a crippling effect for any manufacturer.

With regard to the present disclosure, for simplicity, the inventors will use as an example a heatless dryer configuration having a 100 SCFM capacity at 100 PSI and 100° F. Such a dryer would be paired with a 100 SCFM air compressor (being 25 horsepower) and will have drains and filters as aforementioned above. Further, a dewpoint of −40° F. with an alarm 'trip' of −20° F. would be a default operation setting as an example. Additionally, a typical cycle time of 10 minutes (5 minutes per tower) is common for heatless dryers. It is important to understand, that a portion of dryer 'output' of dried air is used to do the regenerating of the off-line tower (from the on-line tower), for example 15% SCFM, and, that only 85% SCFM is available for factory use at the outlet of the on-line tower. Exceeding this SCFM capacity would cause a pressure drop and overloading, and the system would become out of balance.

Minor infractions of system balance can be accumulative, and their effects can add up over time in conventional systems. Such minor overload imbalance breaches can increase the moisture in the desiccant bed, and, if closely repeated, can cause more moisture laden layers of stratified compressed air as it passes over the desiccant bed to the outlet of the dryer and into the manufacturing facility. As this accumulative moisture build-up happens, the dryer outlet air quality deteriorates, and the dewpoint will rise. This repeated operating imbalance can eventually cause both desiccant towers to become moisture saturated and can finally become unrecoverable while still delivering quality dry compressed air to the facility. If monitored, personnel would have to intervene and take the dryer off-line to manually recover. If not monitored, the moisture laden compressed air would outlet the dryer, make its way down stream and could lead to costly system failure, as discussed above.

U.S. Pat. No. 9,839,874 to Kipp relates to a two-chamber air dryer for braking rail vehicles pneumatic systems. U.S. Pat. No. 8,425,673 to Burke discloses a means to feed pressurized air (with a controlled moisture content) to a header, and a bypass regulation line via feedback of dew point. U.S. Pat. No. 6,099,620 to Arno discloses a twin tower compressed air dryer having parallel ports used during regeneration to quickly cause water vapor adsorbed by the desiccant to be released and discharged from the vessel, allowing the dryer to be returned to service in a drying mode. U.S. Pat. No. 4,761,968 to Basseen discloses a high efficiency system having (within its structure) two regenerative drying beds of desiccant for heatless purging during regeneration.

Each of the above disclosures require manual observation of the dryer system and require personnel to continually monitor and adjust systems in order to prevent overloading leading to compressed air quality worsening to the point of facility failure.

SUMMARY

The present disclosure solves the problems in the industry by describing a means for pre-learning and analyzing usage characteristics, trending dewpoint, initiating preemptive overload recovery, and fail-safe renewal modes. A system and method that effectively interprets the nuances of dryer cycle operation in real-time and make parameter adjustments to counter minor overload imbalances can avoid a calamitous failure as described above. Such preemptive actions described herein would firstly prevent an accumulative build-up of moisture in the desiccant bed that may eventually lead to a complete failure of the dryer to deliver dry air. Secondly, such a system would allow maintenance personnel to attend to recovery issues and potentially costly production loss. And finally, a dryer system that can avoid overload imbalance disturbances would reduce the high cost of precious compressed air needed to recover from a failure event when both the towers are fully saturated with moisture. The system of the present disclosure reduces operation costs by limiting unforeseen imbalances and immediately taking preventative measures to correct errors caused by an unacceptable trend.

The system and method of the present disclosure can automatically balance performance by initializing a 'pre-learning' and 'analysis' phase; to establish the cycling throughput usage characteristics. According to the present disclosure, the system and method can intervene, and thus avoid, when necessary in real-time by interpreting a 'trend', and, preemptively adjust dryer cycle accordingly to always keep the twin towers of desiccant at their best operating performance of quality dewpoint, dried compressed air.

Illustrative embodiments of the disclosure are generally directed to a 'heatless' desiccant dryer system of twin tower configurations, such as an up-flow drying/down-flow regenerating, and having conventional valving means (including air-driven actuating valves, check valves, motorized valves and the like), directing flows well understood by those skilled in the art of compressed air dryers. Such embodiments would incorporate a dewpoint measuring sensor, sampling the compressed air exiting the dryer. Further, the embodiments would have sufficient controls to effectively operate the valves to input and channel the compressed air to perform the drying 'on-line' tower, and regenerating 'off-line' tower, for critical functioning and cycling. Wherein such compressed air dryer controls would integrate various states to ascertain a normalize operational profile, and, can take measured steps to correct 'out-of-profile' performance routinely; to prevent continued deterioration of dewpoint air quality output in overload events. Such control means (as indicated above), further has a 'fail-safe' state, giving maximum regenerative benefit, to an overly moisture loaded dryer (beyond any foreseen operational event). In this scenario, the present disclosure would attempt a recovery through exaggerated supplemental purging means (as will be detailed later), that normally would be performed by personnel monitoring such dryer systems for overloading events. The dewpoint trending of the compressed air output of the dryer apparatus is greatly stabilized and maintains balance; relieving the tedious and ongoing monitoring of the compressed air utility as is customary.

Throughout this disclosure, conventional components such as valves (electrically controlled pneumatic, variable modulation stepping, motorized, needle, gate, check, etc.), regulators, flow restriction devices (orifices), pressure (transducers) and temperature sensors (including thermocouples), vessel (tanks) and piping sizes, desiccant diameter size, type and quantity, electronic controls (programmable logic controllers), and dewpoint measurement instruments, etc., are not discussed; because all these items are well known for their use and understood by anyone skilled in the art of compressed air dryers. It is explicitly understood that any configuration of such dryer component means (as listed above or other controlling devices) can be applied to the teachings of the present disclosure, and, have benefit as to achieving a more desirable dryer operation, with a more stable and balanced dewpoint output.

In one embodiment of a compressed air dryer control, there is a 'fixed cycling' predetermined setpoint, in the initialization and pre-learning state. Wherein the balance is focused around the said selectable setpoint base value of fixed cycling time.

In another embodiment of a compressed air dryer control, wherein there are selectable 'fixed cycling' or 'floating cycle' setpoints that are selected at the initialization and pre-learning phase, and, is focused on optimizing an ever-varying cycle setpoint.

In one embodiment, a supplemental purge means can be a fixed flow capacity purge valve delivering the same percentage of purge air as the normal purge percentage, or, a modulating flow capacity purge valve delivering an ever-varying amount of purge air flow.

Still a further embodiment of a compressed air dryer, would have a supplemental purge method; as a fail-safe backup to bring the dryer operation out of a deep overload condition.

Another embodiment of a compressed air dryer, would incorporate a modulating purge air supply, wherein said modulated purge air is adaptive to operating conditions, supplying more or less purge air as demands permit.

One objective of a compressed air dryer control is to have an initialization and pre-learning/analysis phase of cycling, to allow a dryer instillation to acclimate to its use by developing 'usage-profile' logs. Wherein, said use is evaluated as to ongoing conditions and to determine the best suitable operating format for that particular dryer instillation; in a continually updating process.

Another objective of a compressed air dryer control is to have a selectable 'range' of time for said an initialization and pre-learning/analysis phase.

Still another objective of a compressed air dryer control is to maintain a normal 'stable operations' state, where the balance of drying and regenerating is in a continuous best dewpoint quality range.

Yet another objective of a compressed air dryer control is to realize a dewpoint trend having both a 'GOOD' and a 'BAD' protocol process. Wherein trending, either good or bad, is interpreted with operating parameters so adjustments can be automatically implemented to maintain balance.

Another objective of a compressed air dryer control is to incorporate an alarm signaling, to give rise to potential out-of-balance operations; beyond the dryer's ability to recover, without the cause of the imbalance addressed by maintenance corrective action.

Another objective is a fully reactive recovery protocol. Wherein recovery is affected by operating imbalance corrective actions in the use of automatic decrementing or incrementing cycle times.

A further objective of a compressed air dryer control is the measuring of the results in corrective actions, where the decrementing or incrementing of cycle times preemptively, determine if more or less correction is necessary; to maintain a positive corrective action, and, return the recovery back to a stable, normal operating state.

One other objective would be to implement an effective overload imbalance avoidance method; as the results of pre-learned and analyzed operating incidents. Wherein said avoidance is measured by trimming dryer regeneration, to best suit a current potential undesirable development.

Still another objective of a compressed air dryer control is the use of a supplemental purging method, should an overload imbalance exceed any possible way for the dryer to recover in the reactive recovery state. Wherein said supplemental purging represents a 'fail-safe' operation that can be initiated either automatically or manually.

Finally, an objective of an improved performance of a compressed air dryer controlling apparatus, with preemptive correction actions and operating states can be adapted to other embodiments, expanding of dryer configurations to include utilization of heater, or heater and blower means, to further assist in the regeneration of desiccant beds.

The present disclosure takes advantage of all these objectives listed making them easy to apply to existing conventional compressed air dryer configurations listed earlier, and, most particularly to heatless configuration dryers.

Disadvantages of prior art listed earlier are overcome, with respect to their inability to recognize an imbalance (via a pre-learning process and determining a 'profile' of operation), to preemptively initiate corrective actions, to automatically stable dryer quality dewpoint that heretofore was maintained only with hands-on personnel monitoring and adjusting dryer settings daily/hourly events in operations.

BRIEF DESCRIPTION OF THE DRAWINGS

The disclosure will now be described, by way of example, with reference to the accompanying drawings, in which.

DETAILED DESCRIPTION

Figure 1:
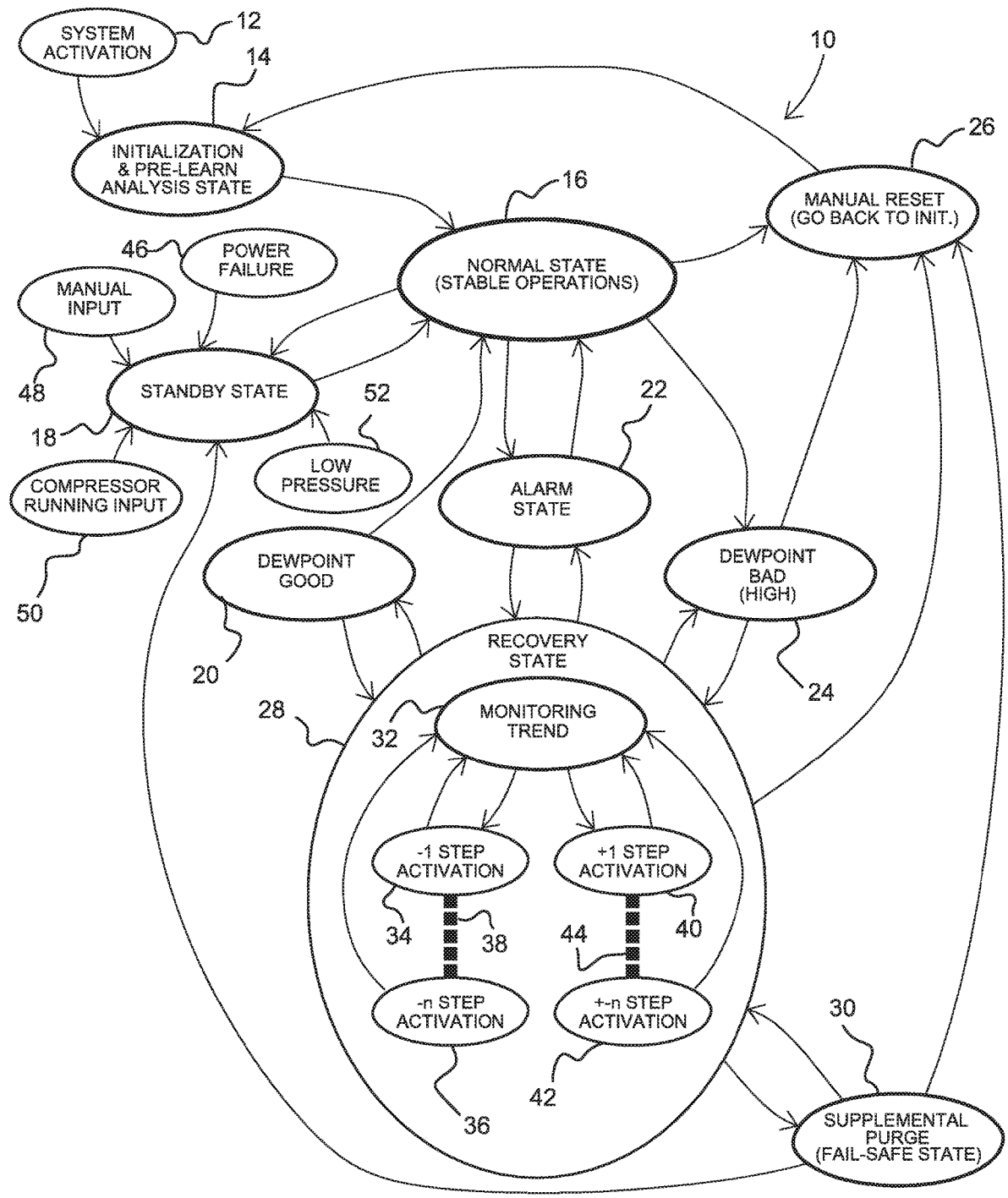
FIG. 1 is a flow chart of a 'state table', of a compressed air dryer control showing operating pathways of various functioning processes and methods of a desiccant compressed air dryer, in accordance with an embodiment of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions (tank size, piping size, valve size, desiccant size, compressor capacity, dryer capacity) and other physical characteristics, sensor means, measurements, etc., relating to the embodiments disclosed herein are therefore not to be considered as limiting, unless the claims expressly state otherwise.

Like reference numerals refer to like indications throughout the various views of the drawings.

An improved compressed air dryer having preemptive overload avoidance and recovery, is referenced in FIGS. 1-11.

As referenced in FIG. 1, a compressed air dryer control 10 is disclosed. The managing state table and pathways revealed in the compressed air dryer control 10, provides a simplified understanding of operations of the present disclosure; wherein a system activation 12, an initialization and pre-learn analysis state 14, a normal (stable operations) state 16, and standby state 18 are disclosed. The system activation 12, upon installation start-up, commences the initialization and pre-learn analysis state 14. The user can optionally set a learning period of between 0 and 168 hours for example (one week) to establish operational usage-profile logs, and, to 'dry-out' the facility system during start-up; these features will be discussed later in the trending section of the present disclosure. In one embodiment, the present disclosure includes an operating system having at least one functioning state of features always active; a standby state to effect non-drying-operating situations, a normal state to effect general drying functions when conditions are said to be balanced, a recovery state when out-of-balance overloading has occurred, an alarm state giving notice to 'BAD' trending, a "GOOD' trending, an alerting means, and a supplemental purge state providing a quick turn-around to a reestablish normal dryer operations.

After the initialization process 16 is complete, the system advances to the normal (stable operations) state 16. Here, if all is stable with respect to dewpoint, pressures (and temperatures if needed), the system is considered 'balanced', and, will remain in the normal state of switching towers to provide quality drying compressed air from the on-line tower and regenerating the off-line tower. (Dryer towers, switching valves and other common features of compressed air-drying devices will be discussed in the Prior Art section of FIG. 2.) Should inputs power failure 46, manual start/stop 48, compressor running 50 and low pressure 52 inputs be activated, the system will place itself in a standby state 18. The main feature of standby state 18 is to close the exhaust valve to allow both the towers to re-pressurize and stop all cycling. Timing and, the point in the regenerating phase, are memory retentive upon the system starting-up again; so, the process can begin at the point of interruption (after the regenerating tank is depressurized again).

Further in FIG. 1 is shown dewpoint 'GOOD' trending 20, dewpoint 'BAD' trending 24, alarm state 22, and, manual reset (go back to initialization) 26. Normal state 16 has the benefit of both the dewpoint 'GOOD' trending 20 and dewpoint 'BAD' trending 24; to seek balance and deliver target setpoint or below, dryer out air dewpoint. An alarm state 22 has two functions. Firstly, to provide a bandwidth of dewpoint range where preemptive corrections can be made, and secondly, to provide an output signal that would alert that the dryer has actually crossed into a bad dewpoint value, and becomes active if the output air quality is not within the predetermined set point parameters (which will also be discussed later).

FIG. 1 also shows a recovery state 28 and a supplemental purge (fail-safe) state 30. Within the recovery state 28, is a monitoring trend 32, a −1 step activation 34, a −n step activation 38, a 'minus' number-of-steps decrementing 38, a +1 step activation 40, a +n step activation 42, and a 'plus' number-of-steps incrementing 44. If the recovery state 28 is entered, the monitoring trend 32 becomes the primary influence in determining cycle time for drying and regenerating the towers, e.g., not normal operations because of imbalances. Monitoring trend 32 can decrement or increment step/minutes (−1 step activation 34 or +1 step activation 40 respectively), and further step decrementing or incrementing via −n step activation 36 and +n step activation 42 can be stepped as required, as illustrated by dashed lines representing the minus' number-of-steps decrementing 38 and the 'plus' number-of-steps incrementing 44) as the protocol demands, to re-establish normal operations.

The supplemental purge (fail-safe state) 30 provides a reclaiming of the dryer apparatus, should a dewpoint failure deteriorate beyond the recovery capabilities of the recovery state 28. Both the recovery and supplemental states (28 & 30 respectively), along with their relationship, protocols and operations will be discussed further in the flow chart table section below.

Figure 2A:
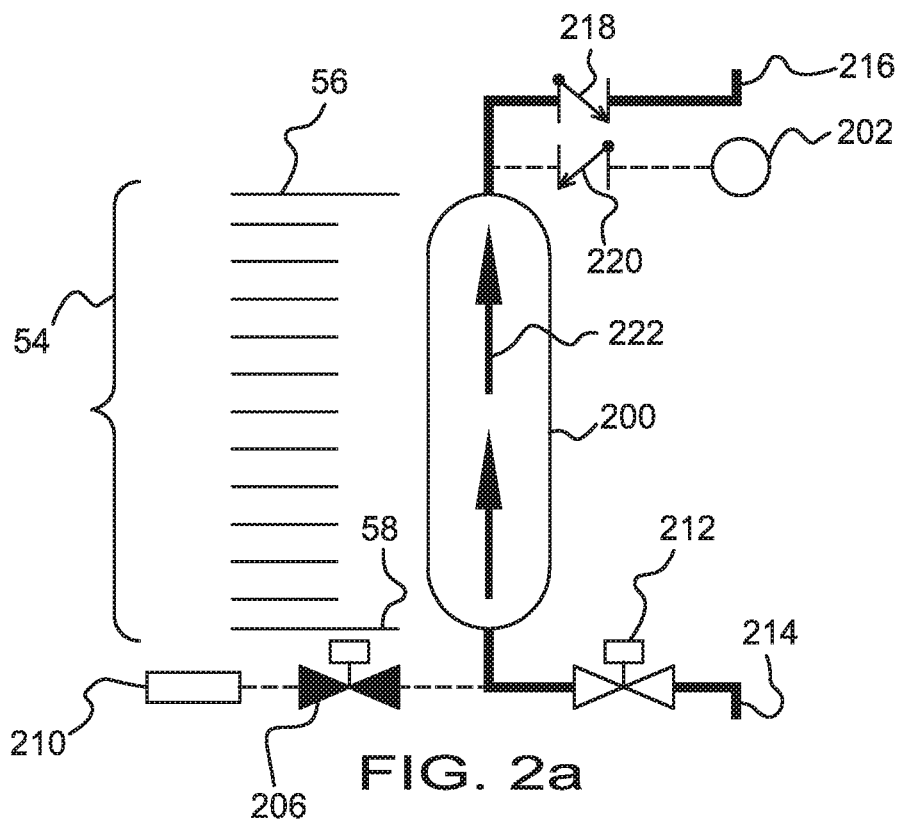
FIG. 2a is a diagram showing prior art; wherein only a 'left tower' of a twin tower system is shown in an on-line drying phase application of a compressed air dryer.

Turning now to FIG. 2a, is a discussion of prior art where a left tower 200 (tank containing desiccant) is depicted in a drying phase. Compressed air dryer components, are generally shown as in a typical configuration, having a tank (tower) containing desiccant, and, showing drying air flowing 222 up the desiccant bed, a dryer inlet 214 and dryer outlet 216, inlet valve 212, exhaust valve 206, dry air check valve 218, purge air check valve 220, and a purge air source 202 (purging air is supplied from the on-line tower, to the regenerating off-line tower, as a percentage of available compressed air flow). Further shown in FIG. 2a is an infinite moisture stratification 54 scale (for illustrative purposes to help the reader better understand moisture stratification), and with driest possible air 56 and wettest possible air 58 indicators on the infinite moisture stratification 54 scale.

Figure 2B:
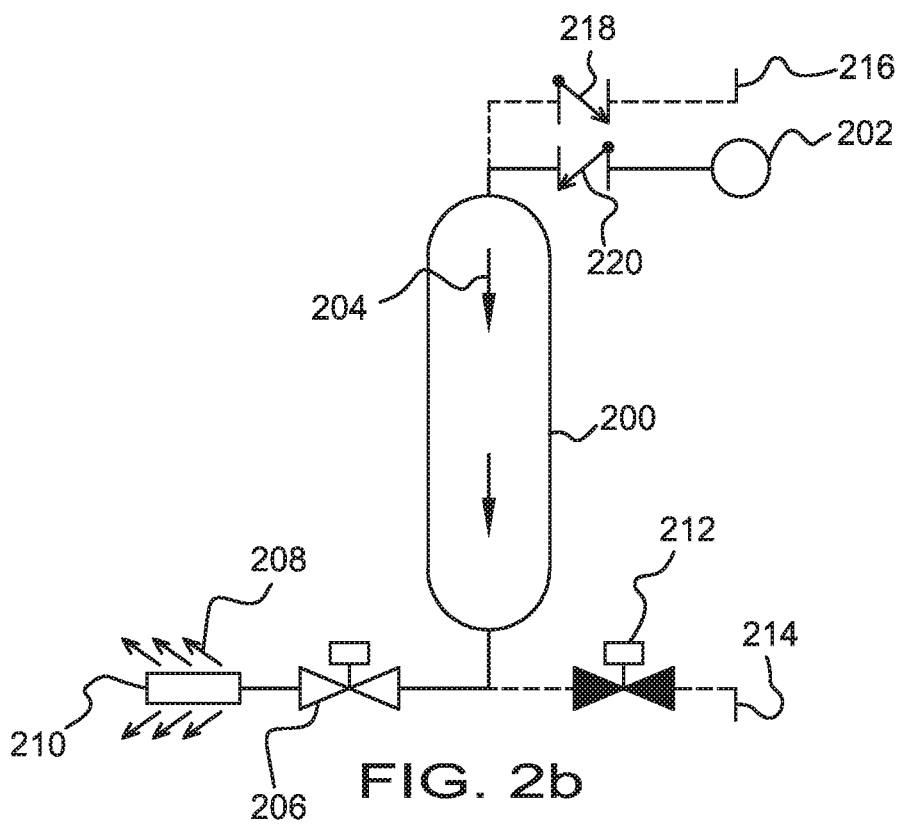
FIG. 2b is a diagram showing prior art; wherein only a 'left tower' of a twin tower system is shown in an off-line regenerating phase application of a compressed air dryer.

FIG. 2b continues with the prior art showing the left tower 200 (tank containing desiccant) in a regeneration phase. Depicted is the purge air flowing 204 down the tank containing desiccant and out the exhaust valve 206 and through the exhaust muffler 210. The arrows at the exhaust muffler 210 shows the captured moisture discharged 208 (within the desiccant bed) being discharged from the system and leaving the desiccant regenerated. The lines in both FIGS. 2a and 2b help the viewer follow the pathways of air flows through the components in the drying and regenerating phases.

Figure 3A:
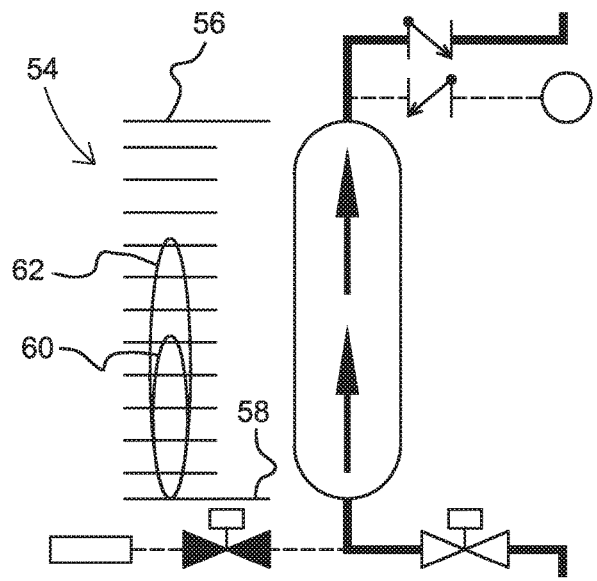
FIG. 3a is a diagram of the dryer 'loading' profile; wherein an example of a moisture representation scale is showing a normal 'stable state', the on-line drying phase.

FIGS. 3a-3d show the infinite moisture stratification 54 scale. Wherein generally there are four typical conditions, in various dryer performance, during the drying phase of the cycle. FIG. 3a has a moisture layer beginning 60 indication, and, a moisture layer ending 62 indication. The moisture layer beginning 60 and moisture layer ending 62 indication are illustrations of possible moisture stratifications of the desiccant bed at the beginning and ending of a drying phase of a cycle. This depiction in FIG. 3a represents a typical balanced representation for purposes of disclosing the present disclosure, and would be considered as ideal.

Figure 3B:
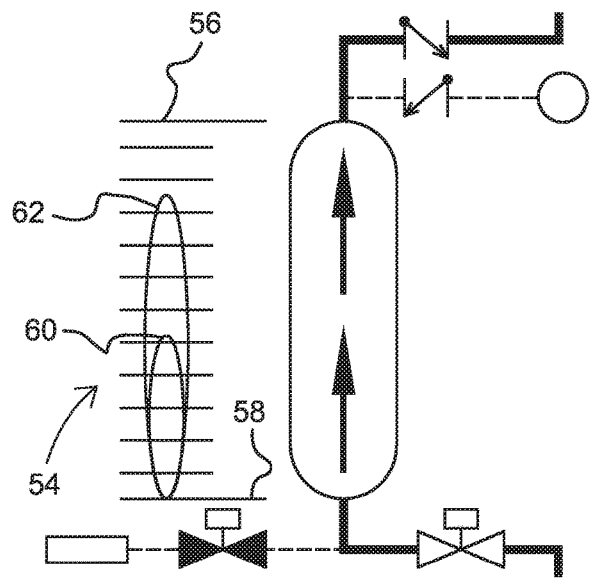
FIG. 3b is a diagram of the dryer 'loading' profile; wherein an example of a moisture representation scale is showing a trend of an 'imbalance' during the on-line drying phase.

FIG. 3b illustrates a performance showing infinite moisture stratification 54 scale deteriorating, wherein the moisture layer ending 62, and would be consistent with a possible upsurge in compressed air throughput. Note the moisture layer ending 62 is higher on the infinite moisture stratification 54 scale.

Figure 3C:
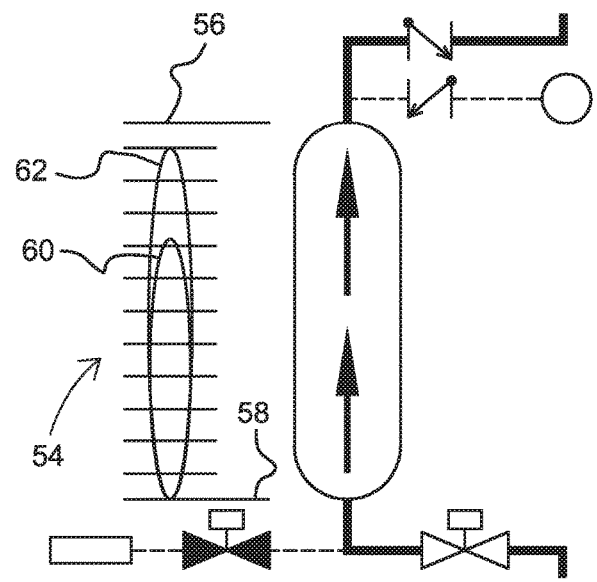
FIG. 3c is a diagram of the dryer 'loading' profile; wherein an example of a moisture representation scale is showing a trending to an 'out-of-limits' situation of the on-line drying phase.

FIG. 3c illustrates a further performance deterioration. Wherein now both the moisture layer beginning 60 and the moisture layer ending 62 air is registered higher on the infinite moisture stratification 54 scale. The beginning 60 and ending 62 layers have an accumulative effect because the previous regenerative cycle(s) could not properly purge the upsurges of moisture during drying phases and therefore has experienced overloading. The representation of FIG. 3c is clearly trending to a 'BAD' dewpoint at the dryer outlet.

Figure 3D:
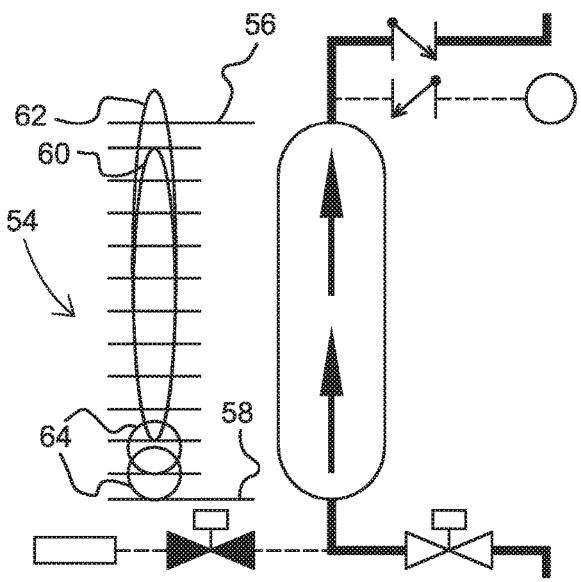
FIG. 3d is a diagram of the dryer 'loading' profile; wherein an example of a moisture representation scale is showing an 'overload failure' situation of the on-line drying phase, wherein said failure will be unrecoverable without extraordinary intervention.

FIG. 3d illustrates a complete performance failure; wherein not only both the moisture layer beginning 60 and the moisture layer ending 62 air register much higher on the infinite moisture stratification 54 scale, and there are fully saturated layers 64 collecting at the inlet end of the twin tower.

The dryer performances shown in FIGS. 3a-3d are accounted for in the higher moisture stratification of the dewpoint 'BAD' trending 24, and, the dewpoint 'GOOD' trending 20, as referenced in FIG. 1.

Figure 4A:
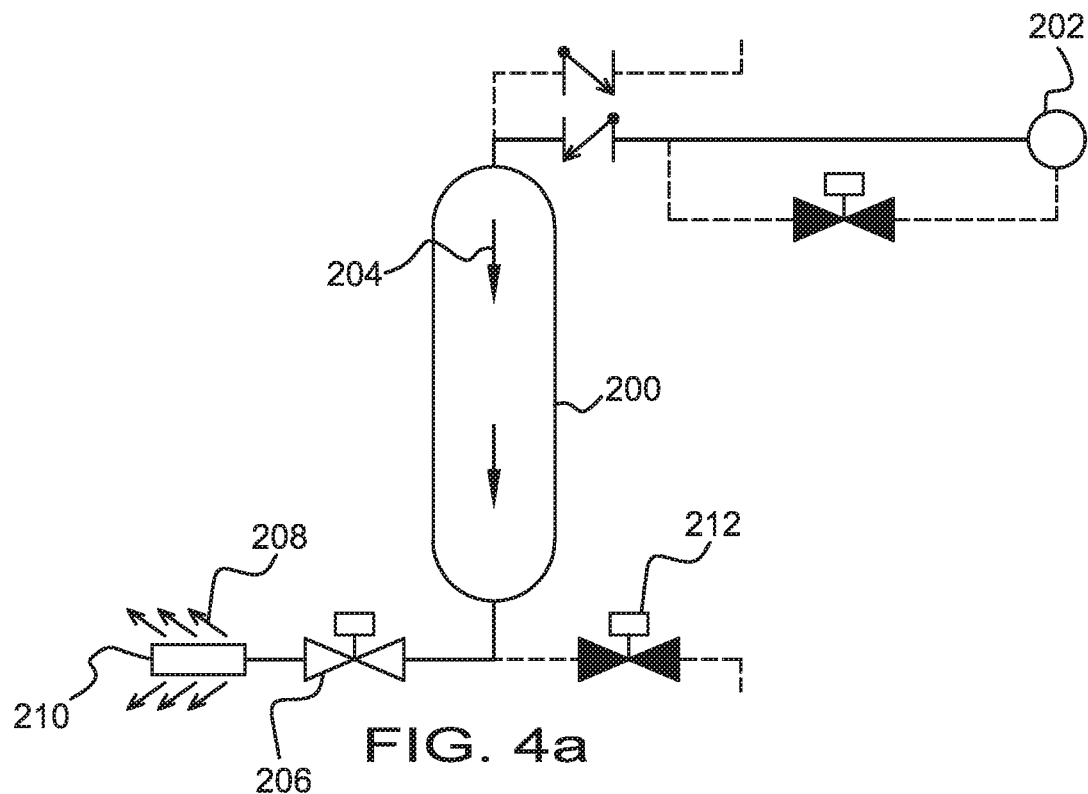
FIG. 4a is a diagram of the dryer regenerating a tower; wherein routine operations are showing an expulsion of captured moisture within the desiccant bed of the off-line regenerating phase, wherein normal and recovery states are represented.
Figure 4B:
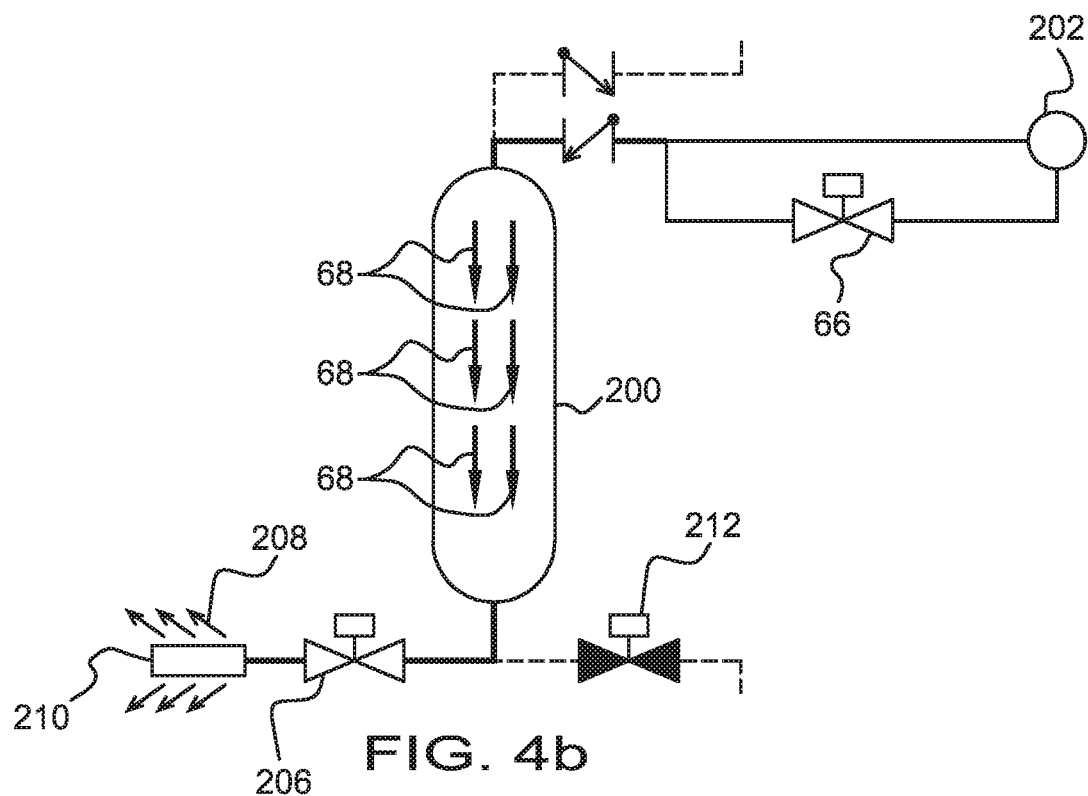
FIG. 4b is a diagram of the dryer in a 'fail-safe' supplemental purge state; wherein extraordinary operations are showing an expulsion of captured moisture in an overly saturated desiccant bed, requiring special involvement to bring the unit back to acceptable operating standards.

FIG. 4a shows a regeneration phase of routine operations taking place where the purge air source 202 provides purge air flow 204 through the tower 200, wherein the tower 200 is defined as a tank containing desiccant, and, moisture 208 is expelled out the dryer tower 200 via the exhaust valve 206 and exhaust muffler 210. Inlet valve 212 is also shown in FIG. 4b. Regeneration is consistent with the operations shown in FIGS. 3a-3c, wherein normal, deteriorating, and recovery states are represented, and, the normal state 16 and recovery state 28 as shown in FIG. 1.

Turning to FIG. 4b illustrates a 'fail-safe' supplemental purge being implemented. A supplemental purge valve 66 supplies auxiliary amounts dry air 68 to the regenerating purge dry air to effectively reestablish the desiccant bed from a failed state to a drying state (as is represented in FIG. 3d to that of FIG. 3a). For the purposes of the present disclosure, failed state may also be referred to as an overload imbalance, a failed event, dryer failure or failed dryer and other equivalent terms. The critical dewpoint failure that caused overloading and advanced the process referenced in FIG. 1 from the recovery state 28 to the supplemental purge 30 would require an input of one of two methods. A manual start process, or, can be initiated automatically upon compressed air pressure fully being restored.

Figure 5:
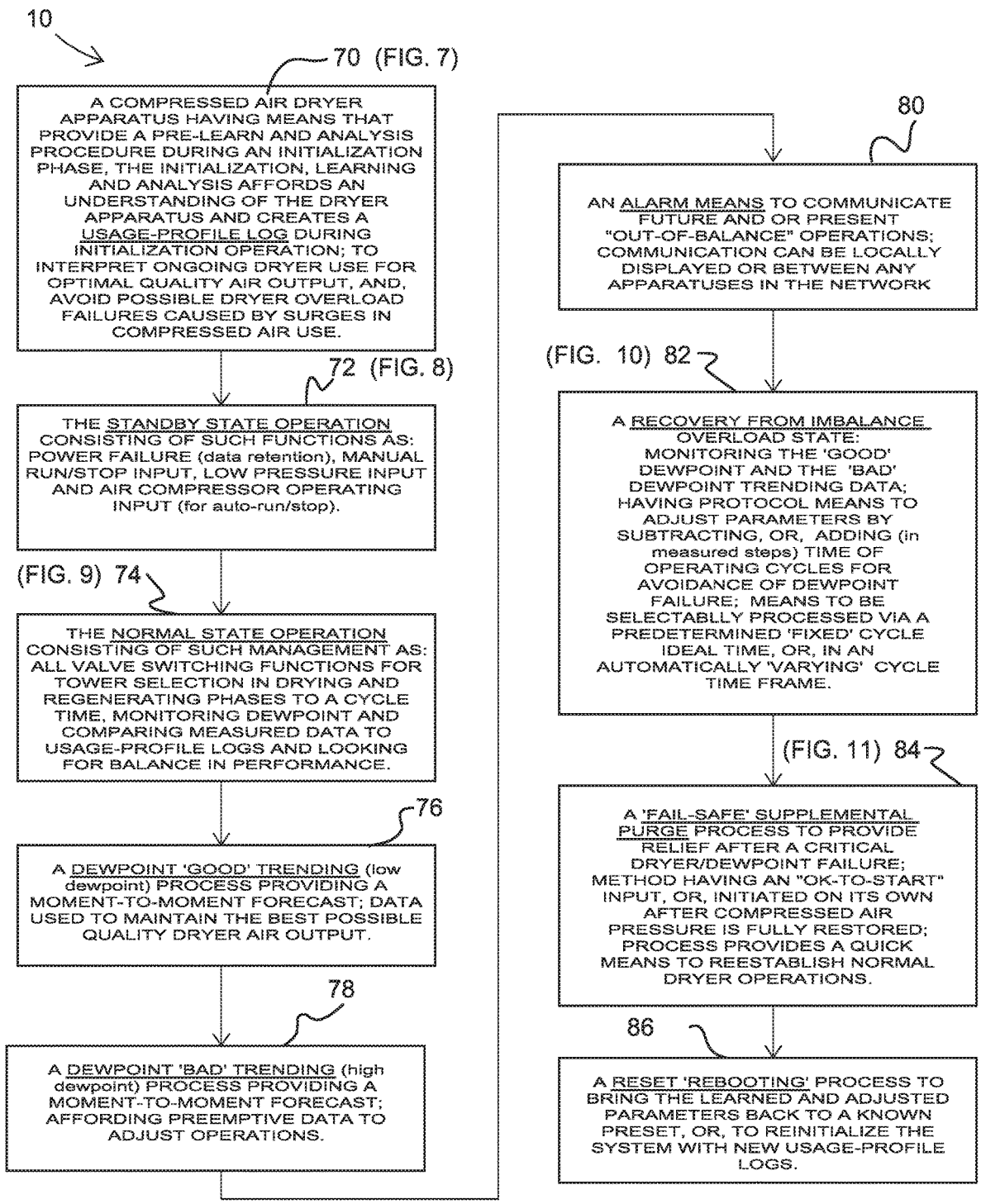
FIG. 5 is a flow chart of a compressed air dryer control with process sequencing, showing an exemplary method of dryer controls having usage-profile logs in performance; to afford preemptively, overload avoidance and recovery (process), and, a supplemental purge fail-safe method, in accordance with an embodiment of the present disclosure.

FIG. 5 is a diagram of a compressed air dryer control 10 with mode sequencing; wherein an exemplary method of dryer controls has usage-profile logs in performance to afford preemptively, overload avoidance and recovery (process), and, a supplemental purge fail-safe method, in accordance with an embodiment of the present disclosure. A usage-profile log 70 process, a standby state operations 72 process, a normal state operations 74 process, a dewpoint 'good' trending 76 process, a dewpoint 'bad' trending 78 process, an alarm 80 signaling process, a recovery from imbalance 82 process, a 'fail-safe' supplemental purge 84 process, and, a reset 'rebooting' 86 process are all disclosed.

A compressed air dryer control having the usage-profile log 70 process, which is a performance summary, may have a determining profile learned and analyzed during an initialization period of time, for example 168 hours, and, can be selectable to any amount of time. The data gathered for pre-learning will be interpreted in ongoing dryer use for optimal quality of dryer performance and avoid possible dryer failure caused by upsurges in compressed air. The usage-profile log 70 is stored in nonvolatile memory and is compared with real-time operating data, as will be discussed below. Further, pre-learning and analysis time can be user adjusted (at point of installation or reboot) to any period of time that suits a user's need.

The sequencing of the compressed air dryer control having the standby state operation 72 process wherein, said standby can be initiated by multiple inputs: a power failure, a manual 'run/stop', a low (operating) pressure, and a compressor operating for auto-run/stop. Each of these inputs will cause the opened exhaust valve to close and thus re-pressurize the regenerating tower in order to conserve compressed air with the facility air system.

Upon leaving the standby state operation 72 process, the sequencing will advance to the normal state operation 74 process. All normal management (valve switching and timing thereof) of the compressed air dryer is achieved within this process, in order to maintain a balanced functioning of drying performance consistent with the profile indicated in FIG. 3a, wherein the moisture layer beginning 60 indication and a moisture layer ending 62 indication are consistent with an acceptable performance as compared to the usage-profile log for dewpoint, as indicated in the process 70 above. The normal state operation 74 process makes use of the dewpoint 'good trending 20 and the dewpoint 'bad' trending conditions as referenced in FIG. 1 above.

An example of the normal performance, with typical cycling time ten (10) minutes, where moisture layer beginning 60 indication, and, a moisture layer ending 62 indication (of the infinite moisture stratification 54 scale referenced in FIG. 1 and FIG. 3a) would produce an excellent dewpoint at the higher tower regions, near the output of the dryer tower 200, with driest possible air 56 and wettest possible air 58 indicators on the infinite moisture stratification 54 scale. The example ten-minute regeneration cycle time is calculated in the following form: DRYER OPERATING FUNCTION={TOTAL CYCLE TIME DURATION minus (TOTAL REPRESSURIZING TIME plus TOTAL EXHAUST DELAY TIME)} divided by two. Wherein each tower has their respective inlet and exhaust valves open for ½ of the total cycle time setpoint (with the exception of a short delay at crossover of the twin towers, and, closing of the exhaust valve, as is conventional sequencing, to allow re-pressurization of the newly regenerated tower to come on-line and not interrupt dryer output flow of compressed air). As long as the usage-profile log, which is a performance summary, is in agreement with current performance, consistent with indications as referenced in FIG. 3a, the dryer will continuously cycle in the normal state operation 74 process, in a balanced manner and produce quality dry dewpoint at the dryer output.

The dewpoint 'GOOD' trending 76 process and the dewpoint 'BAD' trending 78 process, both use measured real-time data (dewpoint, pressure and temperature if needed) to produce a moment-to-moment forecast. This data is used for possible preemptive and avoidance actions. The intent is to give adjustment guidance with respect to the above-mentioned cycle time duration, when needed to the following recovery from imbalance 82 process (that will be disclosed below), else provide status to the normal state operation 74 process. 'GOOD' trending 76 and 'BAD' trending 78 are on independent protocols.

There is an alarm 80 signaling process, will output to two circumstances: firstly, within the sequencing of compressed air dryer control 10 to critical potential future dewpoint failure is imminent and is 'out-of-balance' with usage-profile log, and, secondly to give rise that the dewpoint has in fact reached an alarm setpoint. Both these trip-points can be local to the dryer controls or be communicated via conventional network (as is found in industrial and manufacturing facilities).

The first case of an alarm signaling 80 refers to the profiles as indicated in FIGS. 3b through 3d, where said 'out-of-balance' indications are related to the recovery state 28 process to take action, and internal to the compressed air dryer control 10 sequencing. The second alarm occurs when the dewpoint is actually at or above the alarm setpoint selected by the user, for such purpose as externally notifying alarm conditions.

Turning now to the recovery from imbalance 82 process, wherein the benefit of the above mention alarming notification and both 'good' and 'bad' dewpoint trending is monitored. It is within this element that the decrementing and incrementing step actions are executed. The premise is to 'shorten' the cycle time should the dewpoint deteriorate (caused by a sporadic upsurge of dryer usage for example), in order to preempt a possible forthcoming failure. For example, shifting the on-line drying tower from a five-minute to a four-minute exposure to moistened air throughput, would prevent an unmanageable build-up of moisture on the desiccant bed. It is in this manner that overload avoidance is achieved. If an improvement in the dewpoint trend is now experienced, shifting of the cycle time back, by incrementing the time exposure, this would result in the unit regaining a balanced format process. In one embodiment, a cycle time between dryer on-line drying and dryer off-line regenerating may vary time frames to suit the prevailing performance and dewpoint conditions.

The narrative of managing the step functioning is as follows: the monitoring trend 32 follows profile input grouped as depicted in FIGS. 3a and 3b. Wherein, should the moisture layer ending 62 indication (of the infinite moisture stratification 54 scale) of FIG. 3b increase with higher dewpoint measurements, or above the logged profile, this would cause the −1 step activation 34, to decrement one minute from the total cycle time. If improvements are not seen in the monitoring trend 32, and if the trending is consistent with FIG. 3c, where the moisture layer ending 62 indication has worsened (as has the moisture layer beginning 60 indication), −1 step activation can decrement another minute from the time cycle. It should be noted that all steps, either (−) or (+) are indicated in the recovery state 28, as −n step activation, or, +n step activation with the 'minus' number-of-steps decrementing 38 and 'plus' number-of-steps incrementing 44 respectively. Further, it is important to understand that 'stepping' functions are regulated to a time frame and a performance criterion; that will be more revealed below.

In one embodiment of the present disclosure, although the preferred cycle time is ten minutes, in the 'fixed' cycle default, the system allows the user to select either more or less; to suit their particular drying application and needs in the fixed cycle mode. Recovery from imbalance 82 would decrement down to a practical number (−n) steps, for example three minutes per tower. And when (and if) dewpoint recovery is achieved, the trending process allows the number of (+) steps to return back to the predetermined cycle time user setpoint. Avoidance of a dewpoint failure has then been preemptively realized. The protocol further will subtract 1-step from the cycle time for each hour that the dewpoint does not decrease at least 20% of the difference between the dewpoint set point (for example −40 degrees Fahrenheit), and, the dewpoint alarm set point (for example −20 degrees Fahrenheit), as a means to decrement steps in cycle time. If the dewpoint set point and the alarm dewpoint set point are the same value, the protocol will use a value of 4 degrees Fahrenheit instead of the 20% mentioned above, for checking with the dewpoint profile criterion.

Another feature of the recovery from imbalance 82 process, is, in one embodiment of the present disclosure, instead of the default 10 minutes setpoint of the 'fixed' cycle mode illustrated above, there would be an automatically 'varying' cycle floating time frame. Wherein, the protocol of decrementing and incrementing of minute/steps can increase or decrease (from a default setpoint) to time spanning nearly any practical number; for example, three minutes (each tower) at the low end, to hours at the high end.

An example of a scenario of this application would be where during a single shift manufacturing facility usage where air usage is very light, or, an overnight time where there is no air use at all. Switching towers, here, would only result in wasting compressed air. The decrementing of (−) steps would happen when dryer on-line flow starts to increase again. Here, it is important that once the air has started again, and the cycle time was extended to, for example 30 minutes or 1 hour, the system would reset back to a default cycle time to prevent a moisture build-up in the desiccant towers. More on this recovery from imbalance 82 process will be discussed later in the present disclosure 'in operations' section.

A 'fail-safe' supplemental purge 84 process is disclosed, where a method sets forth to bring a dryer that has reached a failed state and failed out of a saturated desiccant bed situation. Such a scenario would be consistent with and referenced in FIG. 3d, where the moisture layer ending 62 indication and the moisture layer beginning 60 indication has seen many cycles with overload conditions, and, beyond what the recovery from imbalance 82 was able to handle. Higher beginning and higher ending moisture layers in the desiccant beds would build-up and result in more saturated stratification layers where the driest possible air 56 area is laden, and the wettest possible air 58 area is physically wet; as is indicated in the fully saturated layers 64. At this point the dryer is non-functional and must have treatment to re-establish its drying qualities.

The 'fail-safe' supplemental purge 84 process would advance to a supplemental purge 'fail-safe' state 30 (as referenced in FIG. 1). One of the reasons the dryer has failed, and reached a failed state, is that compressed air throughput of the dryer has seen prolonged overloading. So, the supplemental purge 'fail-safe' state 30 provides a user input "OK-TO-START" in initiating the supplemental purging. Alternatively, the supplemental purge 'fail-safe' state 30 can start on its own if selected to initiate self-recovery, and, if and when compressed air is fully restored for a period of time; the system can attempt the supplement purge process automatically.

In either case, when supplemental air is initiated, the supplemental purge valve 66 would open (as referenced in FIG. 4b) allowing auxiliary amounts of dry air 68 to purge the desiccant bed. It is important to understand that a dryer in a failed state as depicted in FIG. 3d can take time to recover back to a normal operation condition and substantial amounts of air is required. The supplemental purge valve 66 can increase the flow over the desiccant bed by any reasonable amount to accomplish this task, for example, an additional 15% of purge air. Further, the cycle time would immediately decrease to the minimum short-cycling format. The supplemental 'fail-safe' purge 84 process would continue until a usage-profile is met and can be considered normal operating conditions (as shown in FIG. 3a). In some embodiments, the supplemental purge is performed using a fixed-flow capacity purge valve delivering the same percentage of purge air as the normal purge percentage, or, a modulating flow capacity purge valve delivering an ever-varying amount of purge air flow.

A compressed air dryer control 10 further has a reset 'rebooting' 86 process; to return the dryer controls back to a known preset of parameters, or, to reinitialize the system with new performance summary usage-profile logs, as was disclosed in FIG. 1, the initialization and pre-learn analysis state 14.

Figure 6:
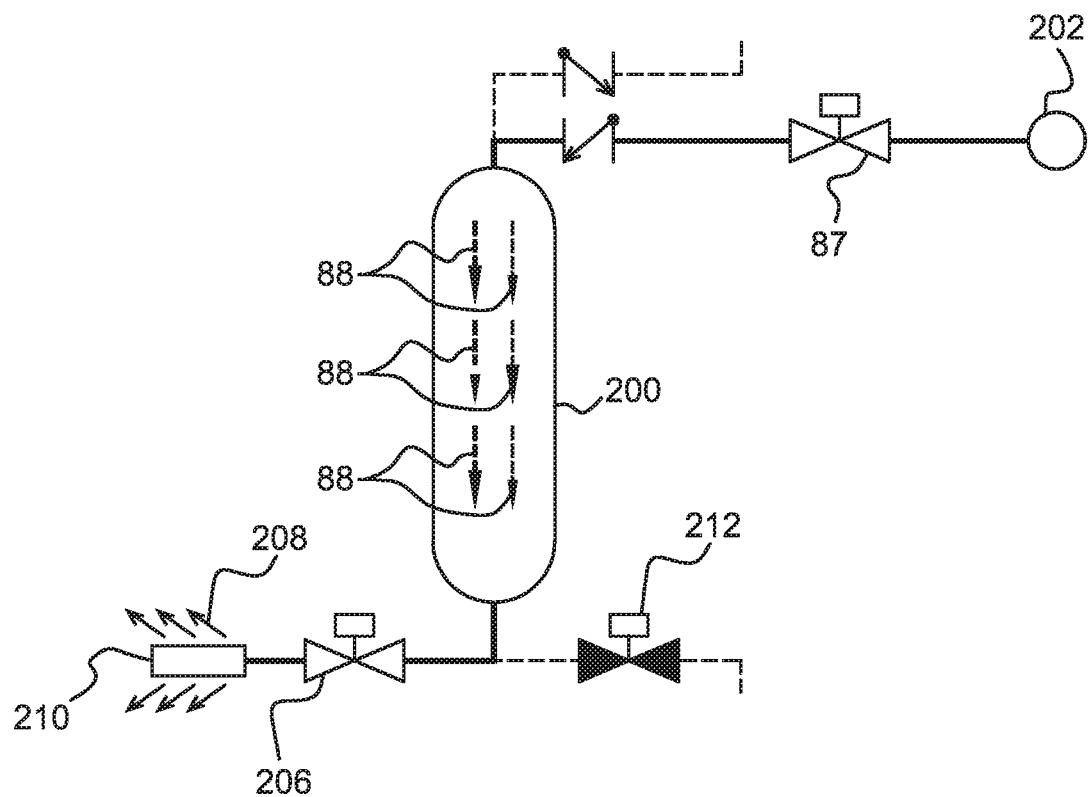
FIG. 6 is diagram of the dryer in an alternate embodiment, wherein the purge air flow is adaptive to conditions via a modulating supply valve.

FIG. 6 discloses an alternate embodiment of a compressed air dryer, incorporating a modulating purge supply valve 87. The modulating purge supply valve 87 can be of any appropriate valve mechanism, for example, electronic stepping, motorized worm-gear, precision balance valving, and the like, that can effectively deliver compressed air. Wherein said modulated purge air is adaptive to operating conditions, supplying more or less purge air as demands permit. In this embodiment, the teachings of both the recovery from imbalance 82 process, and the supplemental 'fail-safe' purge 84 process (of FIG. 5) are combined. Wherein the modulating purge supply valve 87 can restrict purge air flows down from a normal percentage (as the example of 15% was indicated earlier) to much less, or, increased purge amounts up to the supplemental air flow contemplated in supplemental 'fail-safe' purge 84; or even more.

It should be obvious in this embodiment, that the modulating purge supply valve 87 can deliver any amount of purging air to the regenerating tower of desiccant as needed. In one scenario of modulating purge air, this would be if the moisture layer beginning 60 indication, and, a moisture layer ending 62 indication (as illustrated in FIG. 3*a*) are even better than the usage-profile log 70 (disclosed in FIG. 5) comparison process, the modulating purge supply valve 87 can turn the purge air flow down further; to conserve compressed air. In one embodiment, regenerating flow rates may be modulated with a purge valve to increase or decrease in accordance with on-line flow demands so as to not short supply the facility.

In another scenario, when upsurge compressed air usage demand in drying on-line air is rapidly deteriorating and detected by the dewpoint 'bad' trending (as depicted in reference 24 of FIG. 1, and reference 78 of FIG. 5), and illustrated in FIGS. 3*b* and 3*c*, modulating purge supply valve 87 can deliver more purge flow. The modulating purge supply valve 87 can release greater amounts of purge in this situation to preemptively thwart and avoid an overload and thus recover from a possible event as illustrated in FIG. 3*d*; where the air dryer has become inoperative.

It is important to understand that the more purge air flow that happens, the faster a regenerating bed of desiccant can be restored. Also, it should be explicitly understood that the operations of modulating purge supply valve 87 can be synchronized with the available of compressed air being supplied to the inlet of the dryer. For example, should the compressed air pressure drop below an acceptable amount, and make the facility using the air have a too low supply, the modulating purge supply valve 87 can restrict more during those periods of facility demand. Conversely, the modulating purge supply valve 87 can deliver much greater purge air flows during periods, where pressures are normal and facility usage is low (particularly at break, lunch, between shifts, overnight, etc.). Therefore, the present disclosure can 'balance', in any of its embodiments, the ever-changing demands on compressed air needs; to result in a better-quality dewpoint output.

Figure 7:
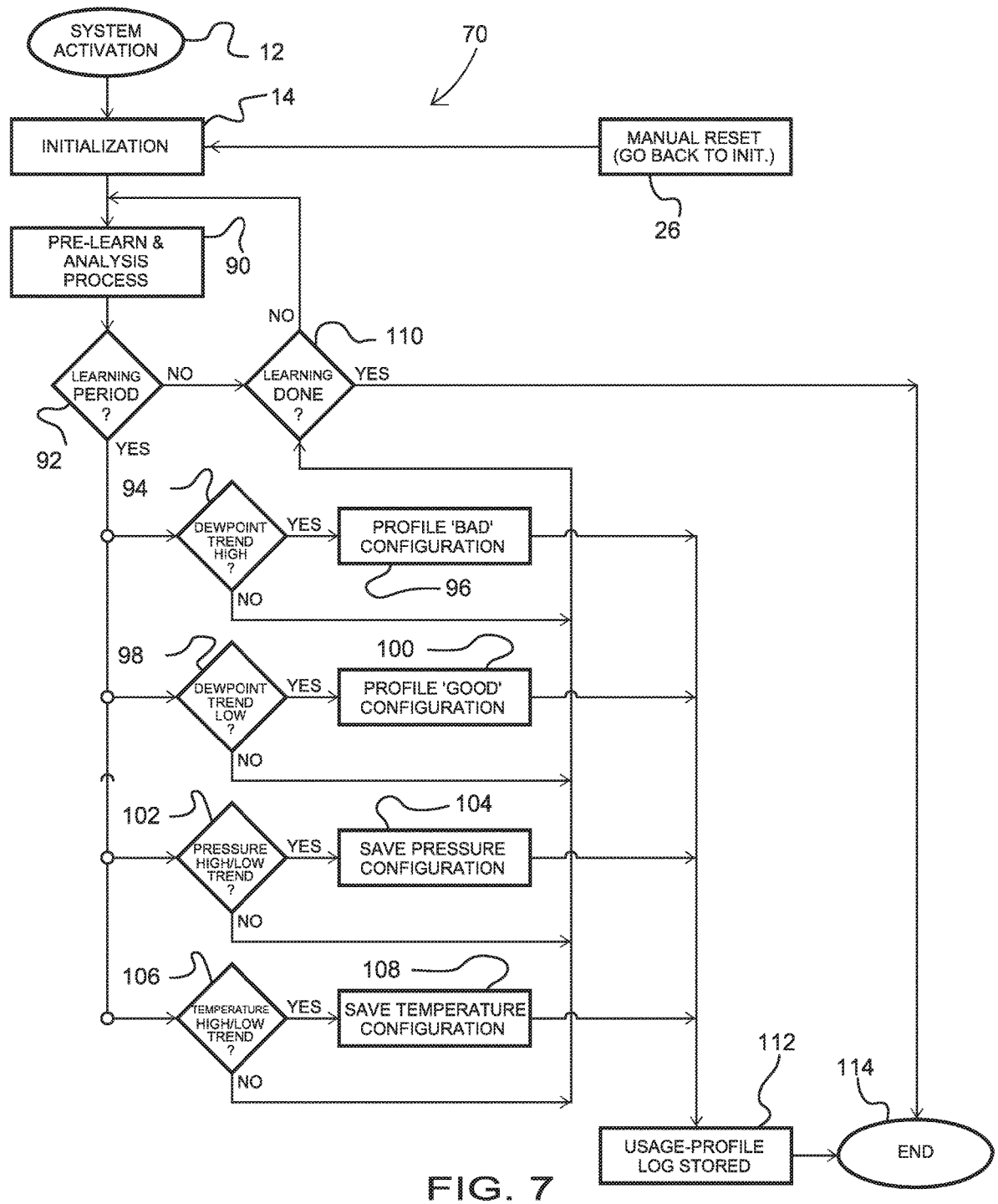
FIG. 7 is a flow-chart specifying the operations process of an INITIALIZATION and PRE-LEARNING ANALYSIS procedure in FIG. 5, in accordance with an embodiment of the present disclosure.

A discussion of simplified flow charts will detail the compressed air dryer control 10 in FIGS. 7 through 11 as follows. FIG. 7 is a flow-chart of the operations process wherein the INITIALIZATION and PRE-LEARNING ANALYSIS procedures (in FIG. 5), in accordance with an embodiment of the present disclosure is detailed. A system activation 12, initiates the usage-profile log process 70, wherein initialization 14, or manual reset 26 prepares the following: a pre-learn & analysis process 90, a learning period-? 92 inquiry, a dewpoint trend high-? 94 inquiry, a profile 'bad' configuration 96, a dewpoint trend low-? 98 inquiry, a profile 'good' configuration 100, a pressure high/low trend-? 102 inquiry, a save pressure configuration 104, a temperature high/low trend-? 104 inquiry, a save temperature configuration 108, a learning done-? 110 inquiry, a usage-profile log stored 112, and, an end '70' process 114.

The pre-learn & analysis process 90 manages the configuration of the profile logs that are learned in the learn period 92. The learn period 92 can be variably set to any amount of time desired (the default is 168 hours (one week) as the preferred learning time period). The dewpoint trend high-? 94 inquiry, dewpoint trend low-? 98 inquiry, pressure high/low trend-? 102 inquiry, and temperature high/low trend-? 104 inquiry all respond to sensor measurements (temperature, pressure, dewpoint, etc.). These measurements are processed in appropriate trending methods set in usable format at the profile 'bad' configuration 96, profile 'good' configuration 100, save pressure configuration 104, and, save temperature configuration 108. Once the learning done-? 110 inquiry predetermined time frame has been accomplished; the created data is stored in the usage-profile log stored 112. The usage-profile log process 70 is complete and exits via the end '70' process 114. It should be understood that the usage-profile log can be updated, from the initial recording of such, on a continuous basis, for example, in a 'first-in-first-out' format scheme, to always have 'fresh' data to use in the profile process performance summary. In one embodiment, a variable pre-learn and analysis period affords understanding of dryer behavior, wherein the pre-learn and analysis period can be a variable period of time to a set point input to suit any given dryer installation.

Figure 8:
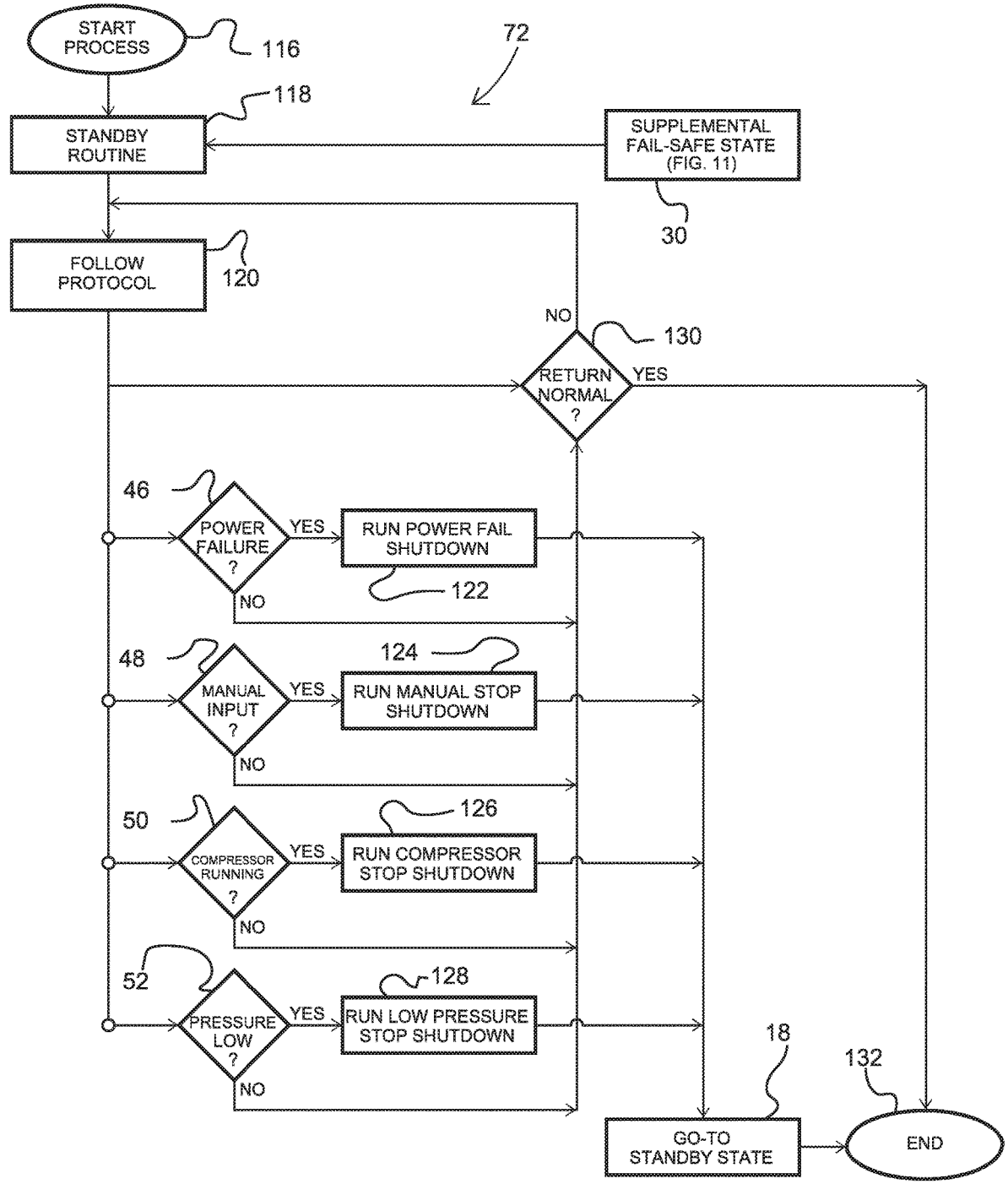
FIG. 8 is a flow-chart of the program STANDBY (stable operations) process of FIG. 5, in accordance with an embodiment of the present disclosure.

Turning now to FIG. 8, where a simplified flow-chart of the program STANDBY (stable operations) process of FIG. 5 is disclosed, in accordance with an embodiment of the present disclosure. A start process 116 initiates the standby state operations process 72, wherein a standby routine 118 prepares the following processes: a follow protocol 120, the power failure-? 46 inquiry, manual input 48-? inquiry, compressor running input-? 50 inquiry, and, the pressure low input-? 52 inquiry (as referenced of FIG. 1). These inputs are then process by a run power fail shutdown 122, a run manual stop shutdown 124, a run compressor pressure stop shutdown 126, and, run low pressure stop shutdown 128, respectively, and go to the standby state 18 as referenced in FIG. 1. The follow protocol 120 sequences via a return to normal-? inquiry 130 as long as the system is in a standby state. If there is a call to return to normal operations, at the return normal-? 130 inquiry, the standby state operations process 72 is complete and exits via the end '72' process 132.

Figure 9:
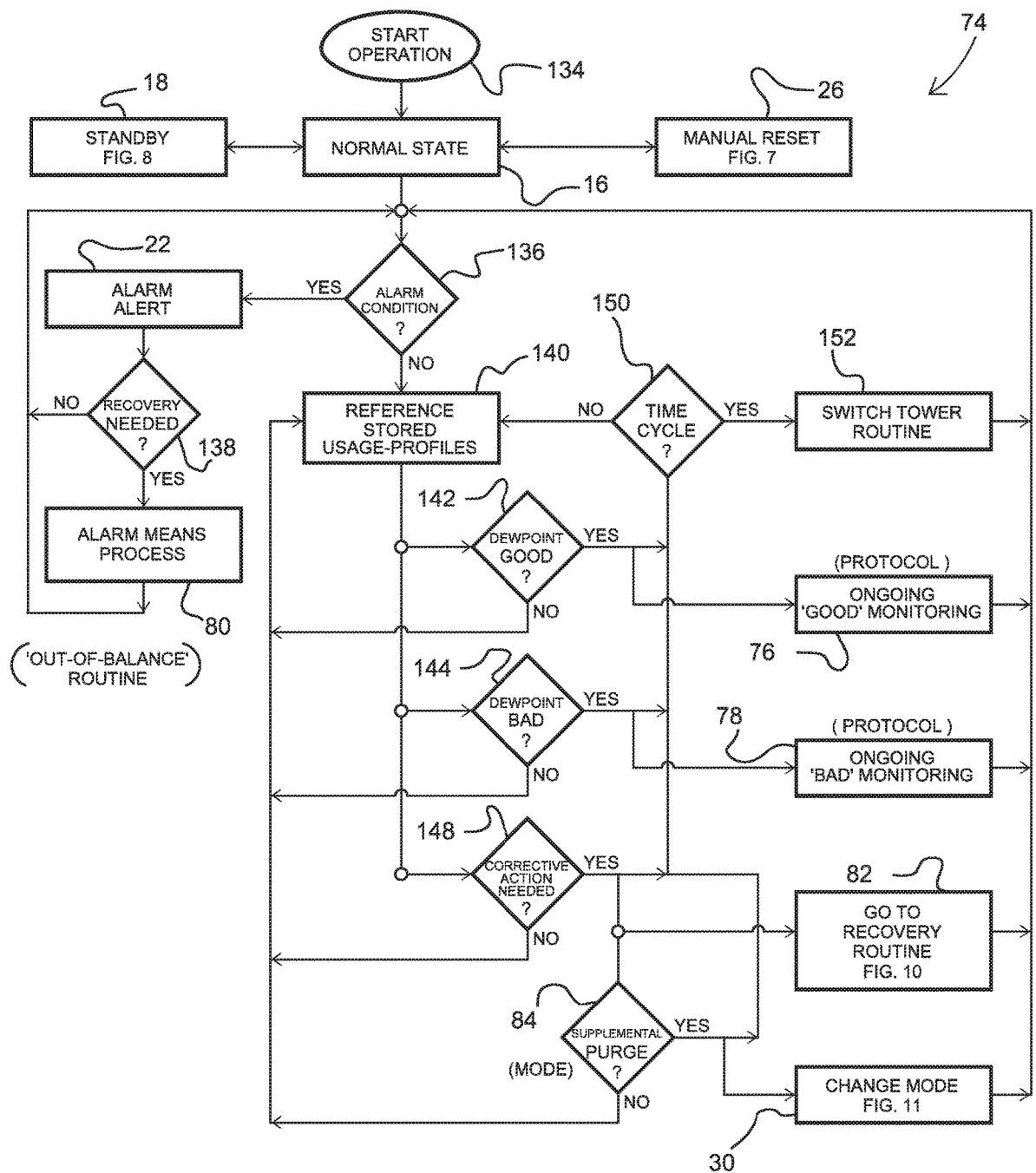
FIG. 9 is a flow-chart of the program NORMAL (stable operations) process of FIG. 5, in accordance with an embodiment of the present disclosure.

The FIG. 9 is a simplified flow-chart of the program of the NORMAL (stable operations) process of FIG. 5 that reveals the basic running rules of the normal state operation process 74, in accordance with an embodiment of the present disclosure. A start operation 134 (for the normal process), initiates the normal state process 74, wherein the normal state 16 referenced in FIG. 1 manages the routine. Normal state 16 is accessed by both the standby state 18 and the manual reset 26; whereupon said functions can interact. An alarm condition-? 136 inquiry is first presented and if YES, the alarm alert state 22 is entered. Else, a reference stored usage-profiles 140 process is entered. The alarms alert state 22 requires a recovery needed-? 138 inquiry. If YES, the (out-of-balance routine) alarm 80 signaling process is entered, else if NO, the system reverts back to main inquiry.

At the reference stored usage-profiles 140 process, the inquiries are made; a current dewpoint 'if-good'-? 142 inquiry, current dewpoint 'if-bad'-? 144 inquiry, and, corrective action needed-? 148 inquiry are processed. It is at these junctures that the ongoing 'good' monitoring (of dewpoint 'GOOD' trending process 76), ongoing 'bad' monitoring (of dewpoint 'BAD' trending process 78), and, go to recovery routine (recovery from imbalance process 82) are all managed. Further, a supplemental surge-? 84 inquiry will allow changing modes of operation. The 'fail-safe' supplemental purge process-? 84 inquiry (and referenced as supplemental purge 30 of FIG. 1) is an optional feature that will be more fully disclosed later. There is a time cycle-? 150 inquiry, that manages the tower switching 'cycle time' (that was discussed earlier that can be fixed or variable (floating) cycle depending on the embodiment configuration). In all these processes, there are means to circle-around in a continuous routine manner to service the normal state operation.

Figure 10:
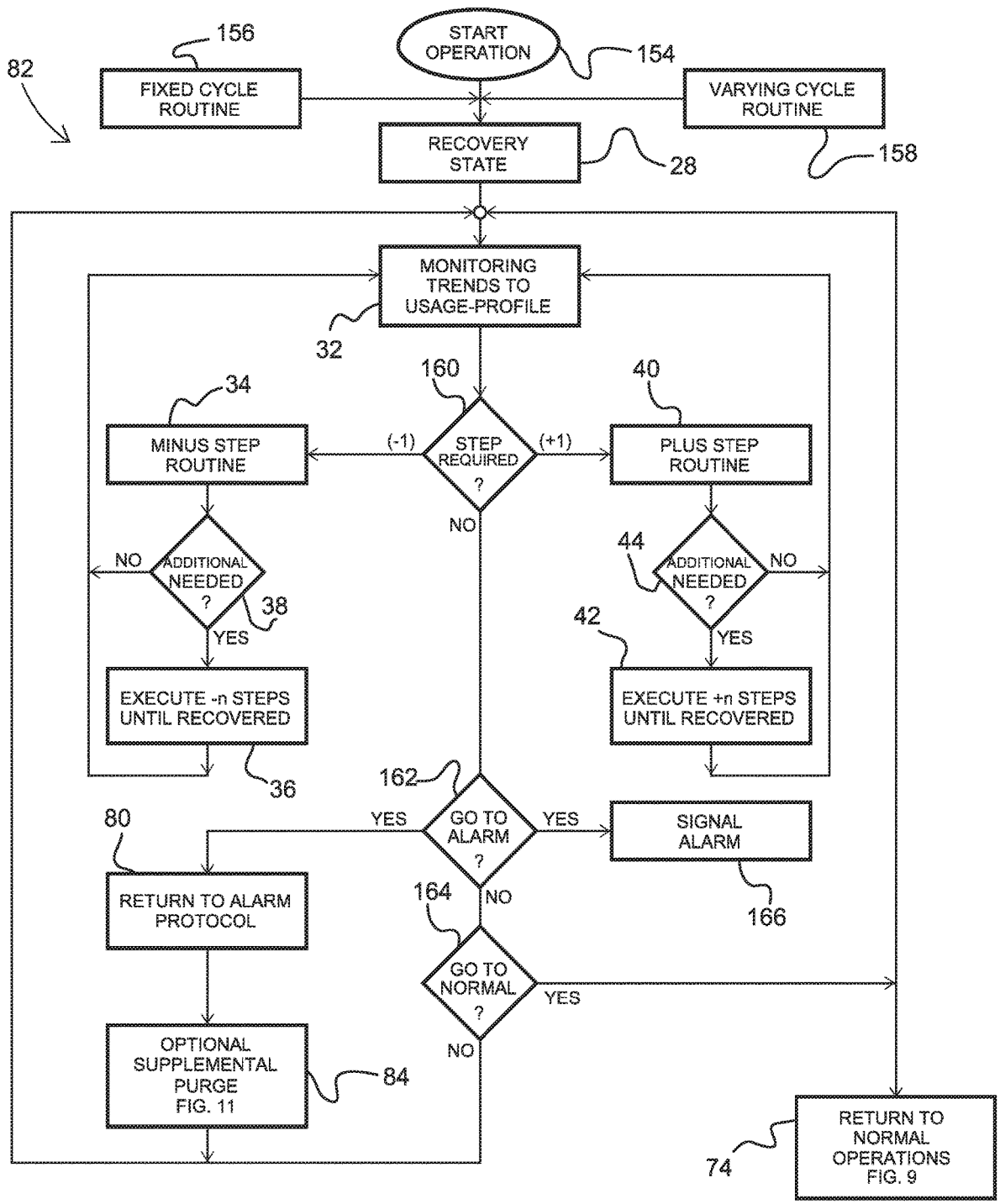
FIG. 10 is a flow-chart detailing the program RECOVERY STATE process of FIG. 5, in accordance with an embodiment of the present disclosure.

FIG. 10 discloses a simplified flow-chart particularizing the program RECOVERY STATE process of FIG. 5 that shows the main management of the recovery from imbalance 82, in accordance with an embodiment of the present disclosure. A start operation 154 (for the recovery state process 28), initiates the recovery from imbalance 82 overload state, wherein the recovery state 28 referenced in FIG. 1 manages the routine. Recovery state 28 is accessed and can be set up either in one of two modes, a 'fixed' cycle routine 156 or a 'varying' cycle routine 158.

The 'fixed' cycle routine 156 causes the TOTAL CYCLE DURATION (discussed in FIG. 5 and detailed in reference 74) and uses a set point determined at installation as an ideal time in cycling, for example 10 minutes. In this scenario, the towers would switch drying and regenerating (as prescribed earlier) sides every 5 minutes; providing the dewpoint is stable in the normal state 16 process (a process for unstable, imbalance in dewpoint will follow in this section). The 'varying' cycle routine 158 causes TOTAL CYCLE DURATION to use a variable (floating) time frame based on long term drying performance and can vary the TOTAL CYCLE DURATION beyond the user set point under certain conditions. It is important to understand that both the 'fixed' cycle routine 156 and 'varying' cycle routine 158 step the cycle time to increase or decrease according to their unique protocol (being the one is 'fixed' to a specified time frame and the other to a 'floating/variable' time). The 'fixed' cycle routine 156 and 'varying' cycle routine 158 will be more fully disclosed later.

Turning now to the recovery state 28 that manages the recovery from imbalance 82 process; wherein the MONITORING TRENDS TO USAGE-PROFILE (a monitoring trends protocol 32), a step required-? 160 inquiry, a go-to alarm-? 162 inquiry, a go-to normal-? 164 inquiry, a MINUS STEP ROUTINE (−1 step activation 34), a EXECUTE −n STEPS UNTIL RECOVERED (−n step activation 36), an ADDITIONAL NEEDED-? inquiry ('minus' number-of-steps decrementing 38), a PLUS STEP ROUTINE (+1 step activation 40), a EXECUTE +n STEPS UNTIL RECOVERED (+n step activation 42), an ADDITIONAL NEEDED-? inquiry ('plus' number-of-steps decrementing 44), a RETURN TO ALARM PROTOCOL (alarm 80 process means), a RETURN TO NORMAL OPERATIONS (normal state operations process 74), and, an OPTIONAL SUPPLEMENTAL PURGE ('fail-safe' supplemental purge process 84).

The MONITORING TRENDS TO USAGE-PROFILE 32 determines if corrective actions are needed in overload conditions; by using data and current measurements as described above (referring to FIG. 5 and the dewpoint 'good' trending 76, dewpoint 'bad' trending 78, alarm 80 process, etc.). The step required-? 160 inquiry direct either a (−1) step to the MINUS STEP ROUTINE 34, or a (+1) step PLUS STEP ROUTINE 40. If no step action is required, the go-to alarm-? 162 inquiry is taken.

MINUS STEP ROUTINE 34 decrements one minute of cycle time each hour that the dewpoint does not decrease (improve, that is a dewpoint of −28° F. improving down to a dewpoint of −35° F. for example) at least 20% of the difference between the users ideal set point and the users alarm set point (the trending would be consistent with the example shown in FIG. 3c disclosed earlier). In time, the ADDITIONAL NEEDED-? inquiry 38 could advance to the EXECUTE −n STEPS UNTIL RECOVERED 36, decrementing additional one minute of cycle time each hour that the dewpoint does not decrease (that is, improve). It should be noted that the TOTAL CYCLE DURATION as mention in the above scenario as 10 minutes, can only practically be step/decremented to a minimum cycle time, for example 6 minutes (three minutes per tower of drying and regenerating). Further, should the previously mentioned user's ideal set point and the user's alarm set point, that are used in calculation along with usage-profile logs, are the same value setting, a four degree (4 degree Fahrenheit) improvement of dewpoint measurements are used to perform the above calculation, and, usage-profile log analysis to set protocol.

Conversely, like the decrementing step/minute per hour above, the PLUS STEP ROUTINE 40 can increment the dewpoint showing improvements; trending to profiles consistent with the examples shown in FIGS. 3b and 3a. In time, the ADDITIONAL NEEDED-? inquiry 44 could advance to the EXECUTE +n STEPS UNTIL RECOVERED 42, incrementing additional one minute of cycle time each hour that the dewpoint continues to improve; for example. This process can continue until the TOTAL CYCLE DURATION has reached back to the original user set (or default) cycle time.

The go-to alarm-? 162 inquiry if 'YES' can access the RETURN TO ALARM PROTOCOL 80 and signal alarm 166. Depending on the embodiment, the system can advance to the OPTIONAL SUPPLEMENTAL PURGE 84 (FIG. 11) process that will be discussed in the next section. The go-to alarm-? 162 inquiry if 'NO' will sequence to go-to normal-? 164 inquiry, where a 'NO' with return the sequencing back to the recovery state, MONITORING TRENDS TO USAGE PROFILE 32 process, else 'YES', will return to RETURN TO NORMAL OPERATIONS FIG. 9 (normal state operation 74) process.

Figure 11:
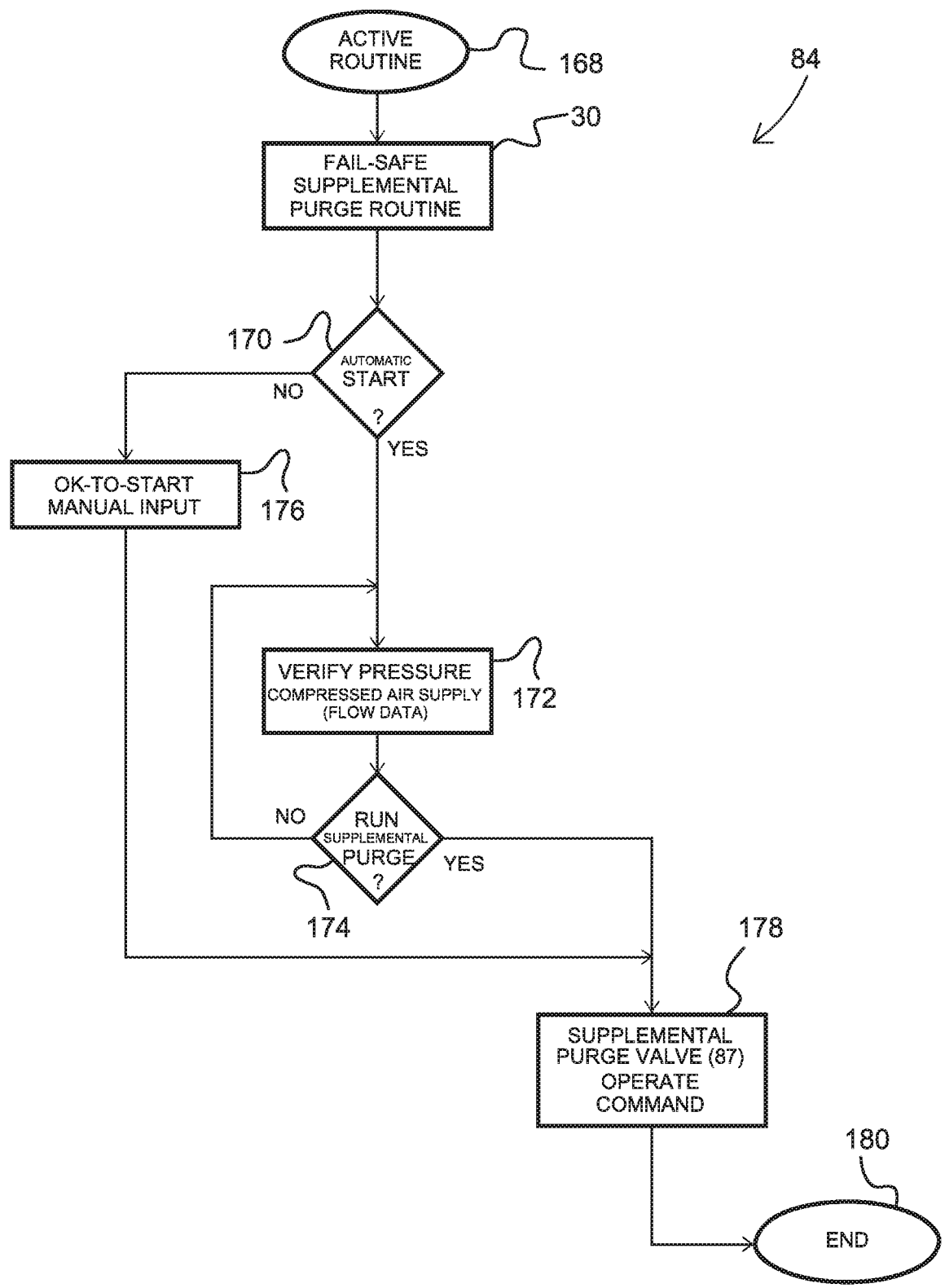
FIG. 11 is a simplified flow-chart detailing the SUPPLEMENTAL PURGE (fail-safe) process for return to a manageable state of recovery of FIG. 5, in accordance with an embodiment of the present disclosure.

The FIG. 11 discloses a simplified flow-chart of an optional 'fail-safe' SUPPLEMENTAL PURGE PROCESS 84, for return to a manageable state of recovery as referenced in FIG. 5, in accordance with an embodiment of the present disclosure. A start routine 168 (for the fail-safe supplemental purge 30 routine), initiates the method and an AUTOMATIC START-? 170 inquiry determines if the process will be manually or automatically run. If 'NO' to the inquiry is true, an OK-TO-START MANUAL INPUT 176 is entered, else, a 'YES' to the inquiry, results in a VERIFY PRESSURE, COMPRESSED AIR SUPPLY 172.

The flow data in 172 controls the RUN SUPPLEMENTAL PURGE-? inquiry 174, depending on a steady pressure of available compressed air (more will be discussed on this necessity later). If 'NO' is the result, meaning there is not enough compressed air available, the routine would return back and sequence again the VERIFY PRESSURE, COMPRESSED AIR SUPPLY 172, as long as the routine 30 is active. Else, a 'YES' would order the SUPPLEMENTAL PURGE VALVE OPERATE COMMAND 178 to open. Either the manual start or the automatic start effects the mechanical operations of the supplemental purge valve 66 (as referenced in FIG. 4*b*), or the modulating purge supply valve 87 (as referenced in FIG. 6). At the completion of supplemental purging, where the twin towers are dried-out, the routine advances and exits at END 180. It is important to understand that the 'fail-safe' supplemental purge routine 30 does not function if compressed air availability is limited. It is completely reactive to pressure and flow conditions.

IN OPERATION, the present disclosure compressed air dryer control 10, having USAGE-PROFILE LOG PROCESS 70 to initialize with a pre-learn and analysis process to collect usage-profile logs between 0 (zero) and 168 hours of dewpoint 'GOOD' and dewpoint 'BAD', pressure high/low trends, (and optional temperature high/low trends if needed) data; a STANDBY STATE OPERATION PROCESS 72 to securely position the dryer during moments the dryer is not used, or from various malfunctions; a NORMAL STATE OPERATION PROCESS 74 to consider all executions of the dryer, including the dewpoint trending protocols, alarm and alerting protocols (76, 78 & 80) for processing; a RECOVERY FROM IMBALANCE PROCESS 82 to take action in decrementing (step/minutes) should the dewpoint indicated an unfavorable trend of increased dewpoint temperature, and, incrementing (step/minutes) when the dewpoint returns back to a low, more normal balanced performance in trending; and finally a TAIL-SAFE' SUPPLEMENTAL PURGE PROCESS 84 to implement an extraordinary amount of purging compressed air to restore a failed state, where in a failed state the dryer becomes totally overwhelmed with an overload of moisture, beyond what the recovery process 82, can handle.

A dryer balance is considered 'GOOD' normal (in one example) when dewpoint performance is better than −40° F., (such as a dewpoint between −40° F. to −50° F. for example); this dewpoint performance would be consistent with the profile referenced in FIG. 3*a*, and function in the NORMAL STATE OPERATION PROCESS 74. In such performance, the dryer would cycle between tower drying and regenerating on the elected CYCLE-TIME (for example 10 minutes, or 5 minutes per side). Dewpoint performance is herein defined as how a particular dewpoint is performing for its intended purpose within the present disclosure.

A dryer needing correction in a preemptive sense to avoid overloading, for example, when dewpoint performance is between −39° F. and −20° F. or −19° F. and −10° F. (or even as great −0° F.), as indicated in FIGS. 3*b* and 3*c* respectively for the two scenarios, would function in the RECOVERY FROM IMBALANCE PROCESS 82, as a means to return to the profile indicated in FIG. 3*a*.

A dryer performance that has failed to the point of an overload and overtaken the dryer, reached a failed state, and thereby needing a 'maintenance' type of rescuing may be when a dewpoint is at 0° F. or in the +° F. range, for example. The scenario here, would be consistent with those indicated in FIG. 3*d* and the means to resolve such an event would use the optional TAIL-SAFE' SUPPLEMENTAL PURGE PROCESS 84 purging valve.

Now, an exemplary protocol of the above-mentioned step/minutes may be regulated with respect to time, for example, one (1) step of cycle time within one (1) hour of dryer cycling between drying on-line and regeneration functions, to decrement and thus shorten moisture exposure the to a 'BAD' dewpoint trending event. In like manner, the incrementing of one (1) step of cycle time within one (1) hour of dryer cycling can restore the shortened CYCLE-TIME back to its original set point of an ideal time when the dewpoint has fully recovered from an overload event.

The compressed air dryer control 10 of the present disclosure is able to restore an imbalance dewpoint trend back to a stable, balanced output of quality dry compressed air. The preemptive correction action may be initiated automatically, thereby resulting in an avoidance of possible dryer downtime due to overloading and a return to normal operations. That total cycling dryer on-line and regenerating modes for recovery can be selected to a 'fixed' time range (that will increment or decrement steps between 6 and 10 minutes for example), or, a 'varying' floating cycle time range; that will cycle beyond usual settings to conserve compressed air if dewpoint conditions permit a variance.

Further it is important that a supplemental purge delivery means effectively reestablish a failure where overloading has completely overwhelmed the dryer's ability to recover on its own. The supplemental purge means may include a special purge valve to parallel the dryer's conventional purge process. The special supplemental purge valve process may have a manual ok-to-start input or can initiate additional purging when dryer conditions permit, e.g., when compressed air is at full operating conditions, and air usage can be tolerated. In one embodiment, a dryer usage-profile log represents various performance summaries that recognizes dewpoint being in ideal, 'GOOD' ranges to trending ranges to overwhelmed, 'BAD' ranges, with respect to capability to deliver dryer output of compressed air dewpoint in an acceptable balanced performance.

In one embodiment, the special supplemental purge valve can be of a modulating type; where delivery of compressed air for regenerating can be throttled-back to barely discernible amounts (during times of high on-line usage), to an amount that would very quickly purge a regenerating desiccant bed when compressed air is more available and not needed for dryer on-line use. Such a dryer configuration would adapt to real-time conditions, giving both more compressed air resources to a facility at demand times, and, more regenerating capability at times when facility demands are low. The resulting dewpoint air quality would be even more stable (less likely to have hills and valleys) than those associated with conventional dryer operations.

Because many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the disclosure should be determined by the appended claims and their legal equivalence.

It is to be understood that the drawings and descriptive matter are in all cases to be interpreted as merely illustrative of the principles of the disclosure, rather than as limiting the same in any way, since it is contemplated that various changes may be made in various elements to achieve like results without departing from the spirit of the disclosure or the scope of the appended claims. All documents cited in the disclosure are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

What is claimed is:

1. A method for drying compressed air, comprising:
purging a desiccant bed in a compressed air dryer;
initializing, over an initialization time period;
developing a usage-profile log;
implementing a pre-learning and analysis period, wherein the pre-learning and analysis period is a variable period of set point input;
controlling the compressed air dryer using an operating system having at least one functioning state of features always active, wherein the at least one functioning state of features includes at least one of a standby state, a normal state, a recovery state, an alarm state, and a supplemental purge state;
varying a time period for a cycle time between the compressed air dryer on-line and compressed air dryer off-line;
decrementing or incrementing regeneration times to match a dryer output condition by varying a cycle time;
identifying a dryer output dewpoint condition as either 'GOOD' trending or 'BAD' trending, wherein the dryer output dewpoint condition reflects a real-time measurement of the usage-profile log to determine whether a preemptive correction is needed to avoid a failed state;
performing a supplemental purge upon occurrence of the failed state to return the compressed air dryer to a useful drying condition;
wherein the supplemental purge can be a user selectable manual start input or an automatically initiated purge.

2. The method of claim 1, further comprising initializing the user selectable manual start input.

3. The method of claim 1, wherein the usage-profile log represents a performance summary ranging from ideal to overwhelmed.

4. The method of claim 1, wherein the usage-profile log is compared to a current dryer dewpoint condition to determine whether a preemptive correction is necessary.

5. The method of claim 1, wherein upon identifying a 'BAD' trending dryer output dewpoint condition, decrementing of regenerating time cycle occurs and is one step per period of time.

6. The method of claim 1, wherein upon identifying a 'GOOD' trending dryer output dewpoint condition, incrementing of regenerating time cycle occurs and is one step per period of time.

7. The method of claim 1, wherein the supplemental purge is performed using a fixed-flow capacity purge valve or a modulating-flow capacity purge valve.

8. The method of claim 1, further comprising trending a dewpoint for overload avoidance.

9. The method of claim 1, further comprising providing a corrective action upon an overload imbalance in a dewpoint performance.

10. The method of claim 1, further comprising adjusting a cycle time in incremental steps in order to stabilize a dewpoint performance.

11. The method of claim 1, whereby the compressed air dryer is a heatless dryer.

12. A method for drying compressed air, comprising:
purging a desiccant bed in a compressed air dryer;
initializing, over an initialization time period, to develop a usage-profile log during a pre-learn and analysis period;
wherein the pre-learn and analysis period is variable;
controlling the compressed air dryer using an operating system having active an at least one functioning state;
wherein the at least one functioning state is at least one of a standby state, a normal state, a recovery state, an alarm state, and a supplemental purge state;
varying a cycle time between dryer on-line and dryer off-line;
wherein the cycle time either decrements or increments regeneration time in each cycle;
identifying a dryer output dewpoint condition as either 'GOOD' trending or 'BAD' trending, wherein the dryer output dewpoint condition reflects a real-time measurement of the usage-profile log to determine whether a preemptive correction is needed to avoid a failed state;
performing a supplemental purge upon occurrence of the failed state to return the compressed air dryer to a useful drying condition;
wherein the supplemental purge can be a user selectable manual start input or an automatically initiated purge after compressed air pressure is fully restored.

13. The method of claim 12, further comprising selecting an initialization period between a set point of between 0 and 168 hours.

14. The method of claim 12, further comprising identifying from the usage-profile log a dryer output dewpoint condition being 'GOOD' trending to 'BAD' trending in order to deliver an acceptable balanced performance in a dryer output of compressed air dewpoint.

15. The method of claim 12, further comprising updating the usage-profile log using a first-in-first-out scheme, wherein the usage-profile log is compared to a plurality of current dryer dewpoint conditions, wherein the plurality of current dryer dewpoint conditions are either 'GOOD' trending or 'BAD' trending, in order to determine whether an overload imbalance is imminent and a preemptive corrective action is needed to avoid the failed state.

16. The method of claim 12, further comprising decrementing a regenerating time cycle by one minute per hour in an event of a 'BAD' trending dewpoint.

17. The method of claim 12, further comprising incrementing a regenerating time cycle by one minute per hour in an event of a 'GOOD' trending dewpoint.

18. The method of claim 12, wherein the supplemental purge is performed using a purge valve selected from the group consisting of a fixed-flow capacity purge valve, delivering a percentage of purge air flow equivalent to a normal purge percentage, and a modulating-flow capacity purge valve, delivering a continuously varied amount of purge air flow.

19. The method of claim 12, further comprising modulating regenerating flow rates with a purge valve in accordance with on-line flow demands in order to not short supply a facility.

20. A method for drying compressed air, comprising:
purging a desiccant bed in a compressed air dryer;
avoiding an overload of moisture in a desiccant bed by implementing a recovery control process;
initializing, over an initialization time period, to develop a usage-profile log during a pre-learn and analysis period;

varying a time period for a pre-learn and analysis period;
controlling the compressed air dryer using an operating system having at least one functioning state of features always active, wherein the at least one functioning state of features includes at least one of a standby state, a normal state, a recovery state, an alarm state, and a supplemental purge state;
varying a cycle time between dryer on-line drying and dryer off-line regenerating to match prevailing dewpoint conditions;
decrementing or incrementing regeneration times to match a dryer output condition by varying a cycle time;
identifying dryer output conditions as either 'GOOD' trending or 'BAD';
avoiding a failed state based on a 'GOOD' trending or a 'BAD' trending data wherein an output condition reflects a real-time measurement of data to the usage-profile log to determine a preemptive correction;
performing a supplemental purge when the failed state occurs to bring back the compressed air dryer to a useful drying condition;
wherein the supplemental purge can be a user selectable manual start input or an automatically initiated purge after compressed air pressure is fully restored;
selecting an initialization period between a set point of between 0 and 168 hours;
identifying from the usage-profile log a dewpoint being 'GOOD' trending to 'BAD' trending in order to deliver an acceptable balanced performance in a dryer output of compressed air dewpoint;
updating the usage-profile log using a first-in-first-out scheme, wherein the usage-profile log is compared to a plurality of current dryer dewpoint conditions, wherein the plurality of current dryer dewpoint conditions are either 'GOOD' trending or BAD' trending, in order to determine whether an overload imbalance is imminent and a preemptive corrective action is needed to avoid the failed state;
decrementing a regenerating time cycle, in an event of a 'BAD' trending dewpoint, by one minute per hour;
incrementing the regenerating time cycle, in an event of a 'GOOD' trending dewpoint, by one minute per hour;
wherein the supplemental purge is performed using a purge valve selected from the group consisting of a fixed-flow capacity purge valve, delivering the same percentage of purge air as a normal purge percentage, and a modulating-flow capacity purge valve, delivering a continuously varied amount of purge air flow.

* * * * *